United States Patent
Singh et al.

(10) Patent No.: US 12,425,412 B2
(45) Date of Patent: Sep. 23, 2025

(54) EVENT-BASED SECURED DATA ACCESS AUTHORIZATION SYSTEM

(71) Applicant: MICRON TECHNOLOGY, INC., Boise, ID (US)

(72) Inventors: Yashvi Singh, Boise, ID (US); Fatma Arzum Simsek-Ege, Boise, ID (US); Tanya Khatri, Boise, ID (US); Yanni Wang, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 603 days.

(21) Appl. No.: 17/746,696

(22) Filed: May 17, 2022

(65) Prior Publication Data

US 2023/0379335 A1 Nov. 23, 2023

(51) Int. Cl.
*G06F 21/00* (2013.01)
*H04L 9/14* (2006.01)
*H04L 9/40* (2022.01)

(52) U.S. Cl.
CPC .............. *H04L 63/105* (2013.01); *H04L 9/14* (2013.01)

(58) Field of Classification Search
None
See application file for complete search history.

(56) References Cited

U.S. PATENT DOCUMENTS

| | | | |
|---|---|---|---|
| 11,016,797 B2* | 5/2021 | Hayes | G06F 9/45558 |
| 11,880,229 B2* | 1/2024 | Strong | G06F 21/755 |
| 2008/0272906 A1* | 11/2008 | Breed | B60R 21/01538 |
| | | | 340/539.11 |
| 2013/0211976 A1* | 8/2013 | Breed | G06Q 10/06 |
| | | | 705/28 |
| 2016/0086391 A1* | 3/2016 | Ricci | G07C 5/08 |
| | | | 701/29.3 |
| 2017/0295181 A1* | 10/2017 | Parimi | H04L 67/535 |
| 2019/0103872 A1* | 4/2019 | Clark | H03K 19/1776 |
| 2019/0279440 A1* | 9/2019 | Ricci | G06Q 10/20 |

(Continued)

OTHER PUBLICATIONS

Jia, Gangyong et al. Dynamic Resource Partitioning for Heterogeneous Multi-Core-Based Cloud Computing in Smart Cities. IEEE Access, vol. 4. https://ieeexplore.ieee.org/stamp/stamp.jsp?tp=&arnumber=7352309 (Year: 2015).*

(Continued)

*Primary Examiner* — Jeremiah L Avery
(74) *Attorney, Agent, or Firm* — Dorsey & Whitney LLP

(57) ABSTRACT

A system may include a memory device, a computing device and a sensor. The memory device may include a first partition and a second partition. The first partition stores first data of a first user at a first security level. The second partition is configured to store second data of the first user at a second security level different from the first security level. The computing device may include at least one processor that implements a machine learning algorithm. The sensor may be configured to provide information to the computing device. The machine learning algorithm analyzes the information from the sensor to determine an occurrence of an event. Based on a determination of the occurrence of the event, the computing device provides access to at least one of the first data or the second data to a second user.

29 Claims, 9 Drawing Sheets

(56) References Cited

U.S. PATENT DOCUMENTS

| | | | | |
|---|---|---|---|---|
| 2020/0125742 | A1* | 4/2020 | Kounavis | H04L 9/0822 |
| 2020/0201789 | A1* | 6/2020 | Durham | H04L 9/0894 |
| 2021/0133577 | A1* | 5/2021 | Srinivasan | G06N 20/00 |
| 2021/0342836 | A1* | 11/2021 | Cella | G06N 7/01 |
| 2021/0377286 | A1* | 12/2021 | Shukla | G06F 21/577 |
| 2022/0036302 | A1* | 2/2022 | Cella | H04L 67/1097 |
| 2022/0070699 | A1* | 3/2022 | Thiyagarajan | H04W 24/04 |
| 2022/0197306 | A1* | 6/2022 | Cella | G06N 20/10 |
| 2022/0216995 | A1* | 7/2022 | Cain, Jr. | B60R 25/24 |
| 2022/0343241 | A1* | 10/2022 | Jha | G08G 1/166 |
| 2022/0366494 | A1* | 11/2022 | Cella | H04L 9/50 |
| 2022/0374797 | A1* | 11/2022 | Kalinski | G06N 3/08 |
| 2022/0382885 | A1* | 12/2022 | Durham | G06F 9/3004 |
| 2022/0383750 | A1* | 12/2022 | Sharma Banjade | G08G 1/005 |
| 2022/0388505 | A1* | 12/2022 | Sharma Banjade | G08G 1/096783 |
| 2023/0074288 | A1* | 3/2023 | Filippou | H04L 47/127 |
| 2024/0073037 | A1* | 2/2024 | McFarland, Jr. | H04L 9/3268 |

OTHER PUBLICATIONS

Bordel, Borja et al. Stochastic and Information Theory Techniques to Reduce Large Datasets and Detect Cyberattacks in Ambient Intelligence Environments. IEEE Access, vol. 6. https://ieeexplore.ieee.org/stamp/stamp.jsp?tp=&arnumber=8386754 (Year: 2018).*

Che, Yuezhi et al. A Lightweight Memory Access Pattern Obfuscation Framework for NVM. IEEE Computer Architecture Letters, vol. 19, issue: 2. https://ieeexplore.ieee.org/stamp/stamp.jsp?tp=&arnumber=9274530 (Year: 2020).*

Weiquan, Xian et al. The Analysis of University Network Information Security System Based on Level Protection Model. 2012 Eighth International Conference on Computational Intelligence and Security. https://ieeexplore.ieee.org/stamp/stamp.jsp?tp=&arnumber=6405913 (Year: 2012).*

Kundu, Chinmay. Towards Dynamic Access Control for Privacy. 2020 Second IEEE International Conference on Trust, Privacy and Security in Intelligent Systems and Applications (TPS-ISA). https://ieeexplore.ieee.org/stamp/stamp.jsp?tp=&arnumber=9325410 (Year: 2020).*

* cited by examiner

EVENT-BASED SECURED DATA ACCESS AUTHORIZATION SYSTEM

BACKGROUND

Secure data access usage has increased across various industries. Owners expect confidential information to be stored with a level of protection that prohibits a third party's unauthorized access. However, not all confidential information requires the same level of protection. For example, an information owner may desire personal health information (e.g., genetic information, medical conditions) to have a higher level of protection (e.g., higher security level) than other information (e.g., insurance policy number, family contact information). The owner may not only wish to store information differently, but access the information differently.

DETAILED DESCRIPTION

Figure 1:
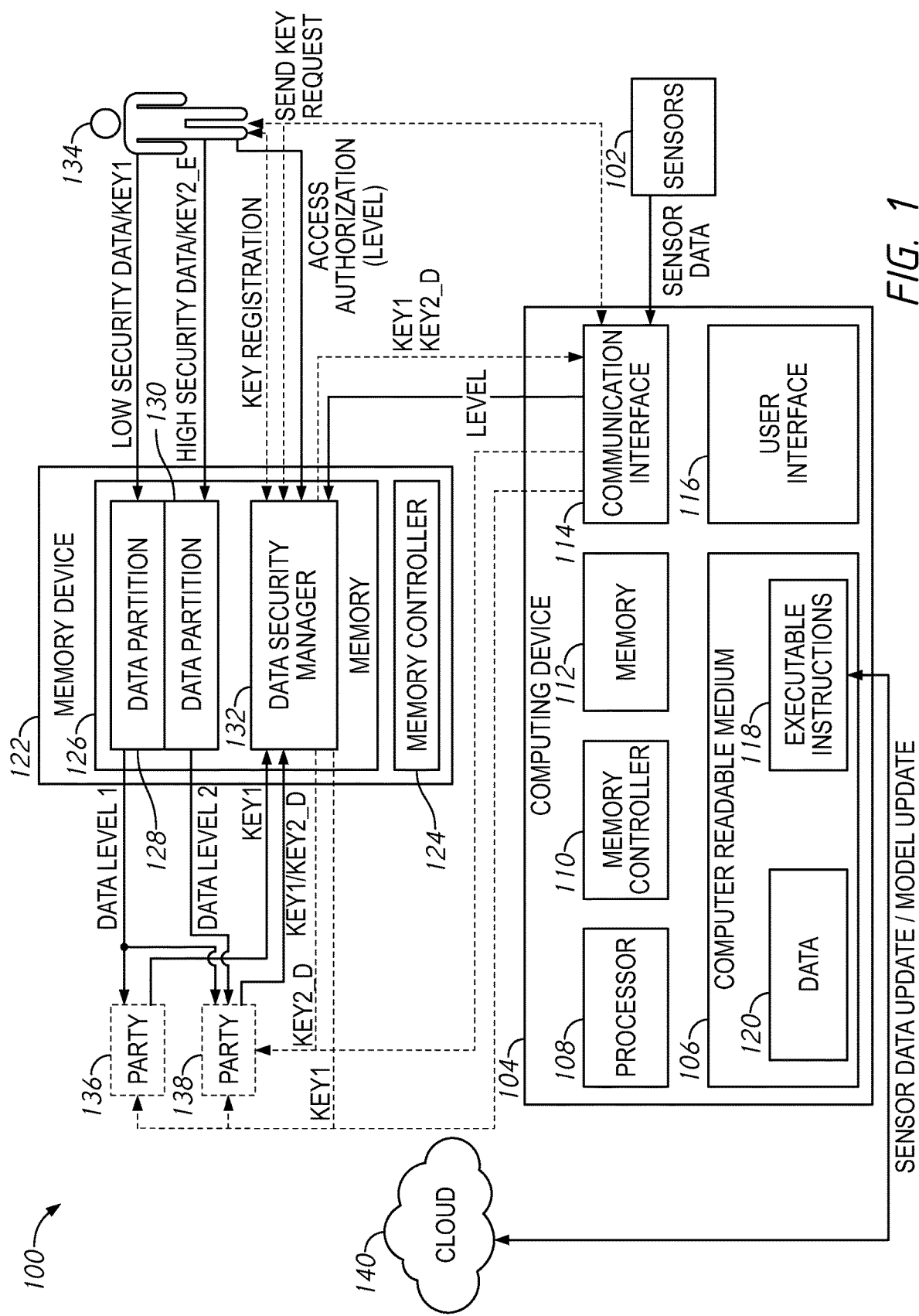
FIG. 1 is a schematic illustration of a secure data access system in accordance with examples of the present disclosure.

The following description of certain embodiments is merely exemplary in nature and is in no way intended to limit the scope of the disclosure or its applications or uses. In the following detailed description of embodiments of the present apparatuses, systems and methods, reference is made to the accompanying drawings which form a part hereof, and which are shown by way of illustration specific embodiments in which the described apparatuses, systems and methods may be practiced. These embodiments are described in sufficient detail to enable those skilled in the art to practice presently disclosed apparatus, systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

As noted, a data owner may store different types of data with different levels of security in a device. However, in certain instances, a data owner may wish to provide others with access to the securely stored information. For example, the data owner may wish to provide one or more individuals with access to certain information (e.g., birth date, contact information for next of kin, etc.) that is less sensitive and provide one or more individuals with access to other information (e.g., genomic information, known medical conditions, etc.) that is more sensitive. All of the information may be stored securely, but the less sensitive information may be stored at a lower level of security than the more sensitive information. In some cases, at least some of the individuals who should have access to the less sensitive information may be different than the individuals who should have access to the more sensitive information. The other individuals may not be individuals in some cases, but entities (e.g., company, hospital). Accordingly, both individuals and entities will be referred to collectively as third parties.

In some instances, the data owner may want to authorize access to the sensitive information to others under certain conditions. However, the data owner may not be available to give consents or authorize access to a third party when such information is needed urgently. For example, when the data owner is in critical condition, medical professionals and healthcare and insurance providers may need access to medical history data of the data owner stored in the device. However, due to unavailability of the data owner, authorization to access the medical history data may not be provided timely. Due to lack of access to the medical history data, effective treatments may not be provided to the data owner. Accordingly, techniques for providing appropriate access to different information stored at different security levels under certain conditions when a data owner is unavailable may be desirable.

Different security levels of data may be stored in different sub units (e.g., partitions, regions) of memory in a memory device. To provide access to different security levels of data, a machine learning model may receive input data from sensors and other input devices. The machine learning model may be pre-trained with other data. The machine learning model may be a dynamically trained machine learning model further trained with the input data. The machine learning model may determine a type of a current event based on the input data. The machine learning model may be implemented by a computing device in communication with a data security manager and/or implemented by the data security manager. The data security manager may grant access to data of a security level according to the type of the current event. In some instances, the data of a higher security level may be the sensitive data that should be disclosed to certain parties. In some cases, the data of a lower security level may be an identification information of a user. The data security manager may grant access to different security levels of data of the data owner even when the data owner is unavailable to authorize access to the data, if the data security manager determines to grant access to a certain security level of data based on the type of event determined by the machine learning model.

FIG. 1 is a schematic illustration of a secure data access system 100 in accordance with examples of the present disclosure. The secure data access system 100 may include one or more sensors 102, a computing device 104, and a memory device 122 that is a secure memory device. Optionally, in some examples, the secure data access system 100 may include a cloud computing device 140.

In some examples, the computing device 104 may include one or more processors 108, a computer readable medium 106, a memory controller 110, a memory 112 and a communication interface 114. Optionally, in some examples, the computing device 104 may include a user interface 116. In some examples, the computing device 104 may be included in a mobile device, such as a smart phone, cell phone, gaming device, tablet, a wearable device such as a fitness device, health monitor, or a head unit in a vehicle. In some examples, the computing device 104 may be implemented wholly or partially using a computer, a server, a television set, or a laptop. In some examples, the one or more sensors 102 may be accessory devices that communicate with the computing device 104. In other examples, the one or more sensors 102 may be an integral element of the computing device 104, sensors on a smart phone, sensors in a portable or wearable device such as a fitness device or a game controller, or sensors in a vehicle. In some examples, the sensors 102 may include, for example, one or more cameras, a touch screen of a smart phone, one or more microphones, health-related sensors, motion sensors, telematic sensors such as speedometers, accelerometers, gyros, shock detector, infra-red sensors, haptic sensors on a steering wheel, etc.

In some other examples, the one or more processors 108 may be implemented using one or more central processing units (CPUs), graphical processing units (GPUs), application specific integrated circuits (ASICs), field programmable gate arrays (FPGAs), and/or other processor circuitry. In some examples, the one or more processors 108 may be in communication with the memory 112 via the memory controller 110. In some examples, the memory 112 may be volatile memory, such as dynamic random access memory (DRAM). The memory 112 may provide information to and/or receive information from the one or more processors 108 and/or computer readable medium 106 via the memory controller 110 in some examples. While a single memory 112 and a single memory controller 110 are shown, any number may be used. In some examples, the memory controller 110 may be integrated with the one or more processors 108.

In some examples, the computing device 104 may include the computer readable medium 106. The computer readable medium 106 may be implemented using any suitable medium, including non-transitory computer readable media. Examples include memory, random access memory (RAM), read only memory (ROM), volatile or non-volatile memory, hard drive, solid state drives, or other storage. The computer readable medium 106 may be accessible to the one or more processors 108 and/or memory controller 110. The computer readable medium 106 may store executable instructions 118. The executable instructions 118 may be executed by the one or more processors 108. For example, the executable instructions 118 may cause the one or more processors 108 to analyze sensor data from the one or more sensors 102 to extract information from images, video, audio, health-related information such as body temperature, heart rate, blood pressure, blood oxygen level, and telematic information such as velocity, acceleration, distance to nearby objects, Global Positioning System (GPS) information, contact or potential contact potential collision impact, airbag deployment record, etc. In some examples, the executable instructions 118 may cause the one or more processors 108 to analyze if there is any physical contact with a holder of the mobile phone including the computer device 104. In some examples, the executable instructions 118 may cause the one or more processors 108 to analyze if there is any health condition change to the holder of the mobile device or a driver of the vehicle including the computing device 104. In some examples, the executable instructions 118 may cause the one or more processors 108 to analyze if there is any theft or collision to the vehicle including the computing device 104. In some examples, the executable instructions 118 may cause the one or more processors 108 to provide commands or other control signals to the one or more sensors 102, and/or other components of the computing device 104, such as the memory controller 110.

The executable instructions 118 may include executable instructions for implementing a machine learning model. In some examples, the executable instructions 118 may cause the one or more processors 108 to use either raw sensor data or processed data based on the analysis using the sensor data. In some examples, the machine learning model may be used to analyze the raw sensor data or processed data to determine whether an event has occurred and/or the criticality of the event.

The computer readable medium 106 may store data 120. In some examples, the data 120 may include raw sensor data and processed data obtained by analyzing the raw sensor data. The raw sensor data may include images, video, audio, health-related information such as body temperature, heart rate, blood pressure, blood oxygen level, and telematic information such as velocity, acceleration, distance to nearby object, GPS information, contact or potential contact, potential collision impact, airbag deployment record, etc. The processed data may include a health diagnosis based on the analysis of the health-related information and/or telematic diagnosis based on analysis of telematic information. While a single medium is shown in FIG. 1, multiple media may be used to implement computer readable medium 106.

In some examples, the one or more processors 108 may communicate information, which may include user inputs, sensor data from the one or more sensors, data and/or commands between one or more components of the computing device 104 using internal communication buses (not shown). In some examples, the communication interface 114 may handle external communications. In some examples, the communication interface 114 may provide a communication interface to another device, the memory device 122, the user 134, and/or a network (e.g., LAN, WAN, Internet). The communication interface 114 may be implemented using a wired and/or wireless interface (e.g., Wi-Fi, BlueTooth, HDMI, USB, etc.). The communication interface 114 may receive sensor data from the one or more sensors 102. The communication interface 114 may provide the received sensor data, or the data 120, such as the raw sensor data and the processed data stored in the computer readable medium 106 to the memory device 122.

In some examples, the user interface 116 may include components such as a keyboard, a mouse, a touch pad, a touch screen, a display, a microphone, a speaker, a camera, and one or more motion sensors. In some examples, the user interface 116 and the sensors 102 may share components, such as the touch pad, the touch screen, the microphone, the camera, and the one or more motion sensors. In some examples of FIG. 1, the user interface 116 may be integrated in the computing device 104. In some examples, the user interface 116 may be coupled to the computer device 104 directly or via the communication interface 114, without departing from the spirit and scope of the disclosure.

In some examples, the computing device 104 may be a cloud computing device. In some examples, the computing device 104 may be included in cloud computing device 140.

In some examples, the computing device 104 may be included in a same device as the sensors 102. For example, computing device 104 and sensors 102 may be included in a mobile device (e.g., mobile phone) or an automobile. In other examples, the computing device 104 may be separate from the sensors 102. For example, the sensor 102 may be located on a fitness tracker and computing device 104 may be included in a device in communication with the fitness tracker (e.g., cell phone).

In some examples, the memory device 122 may include a memory controller 124 and one or more memories 126. Optionally, in some examples, the memory device 122 may include a communication interface, similar to the communication interface 114 in the computing device 104 (not shown). In some examples, the memory device 122 may be included in a mobile device, such as a smart phone, cell phone, gaming device, tablet, fitness device or head unit in a vehicle. In some embodiments, memory device 122 may be located remotely from computing device 104 and/or cloud computing device 140. In some embodiments, memory device 122 may be collocated with or included in computing device 104 and/or cloud computing device 140.

The memory controller 124 may provide basic access control of data in the memory 126. The memory controller 124 may handle memory access operations, such as write, read, precharge, refresh etc., responsive to communication initiated outside the memory device 122.

The memory 126 may include a data security manager 132 and the data partitions 128 and 130. In some examples, the data security manager 132 may be implemented as a computing device similar to the computing device 104. In some examples, the data security manager 132 may include one or more processors using one or more central processing units (CPUs), graphical processing units (GPUs), application specific integrated circuits (ASICs), field programmable gate arrays (FPGAs), and/or other processor circuitry together with a portion of the data partitions 128 and 130 as a computer readable medium storing executable instructions and data. For example, a program related to key generation, encryption and decryption associated with high security level of data may be stored in the data partition 130. Keys for encryption and keys for decryption may also be stored in the data partition 130. For example, a program related to key generation, encryption and decryption associated with low security level of data may be stored in the data partition 128. Keys for encryption and decryption may also be stored in the data partition 128. In some examples, the programs may be stored in another memory and/or memory partition dedicated for programs separate from the data partitions 128 and 130. In some examples, the memory controller 124 may be integrated with the data security manager 132.

In some examples, the data security manager 132 may control access data in the data partitions 128 and 130 instructed by the memory controller 124. The data partitions 128 and 130 may provide information and/or receive information via the memory controller 110 in some examples. While two data partitions 128 and 130 are shown, any number of data partitions may be used.

In some embodiments, the user 134 may initially register and the data security manager 132 may generate one or more keys to access different security levels of data under the control by the user 134. In some examples shown in FIG. 1, the data security manager 132 may generate keys KEY1, KEY2_E and KEY2_D when the user 134 registers. The key KEY1 may be used for encryption and decryption of low security of data stored in the data partition 128. The key KEY2_E may be used for encryption of the high security level of data stored in the data partition 130. The key KEY2_D may be used for decryption of the high security level of data stored in the data partition 130. In some examples, the data security manager 132 may provide the user 134 with the keys KEY1 and KEY2_E. In some examples, the data security manager 132 may provide the user 134 with access login which enables the user 134 to encrypt data uploaded by the user 134 with the keys KEY1 and KEY2_E stored in the memory 126.

In some examples, the user 134 may provide instructions (e.g., requests, commands) to the memory device 122 permit access to data partition 128 and/or 130 to one or more third parties. The user 134 may provide the instructions directly to the memory device 122 and/or via the computing device 104. For example, the data security manager 132 may provide a party 136 with the key KEY1 and may further provide a party 138 with the keys KEY1 and KEY2_D per request by the user 134. In another examples, the data security manager 132 may provide the keys KEY1 and KEY2_D to the computing device 104, then the computing device 104 may provide the party 136 with the key KEY1 and may further provide the party 138 with the keys KEY1 and KEY2_D per request by the user 134. Thus, the party 138 may be granted access to high and low security levels of data in the data partitions 128 and 130 using the keys KEY1 and KEY2_D, whereas the party 136 may be granted access to low security level of data in the data partition 128 using the key KEY1.

During normal operations, the data security manager 132 may grant access to data according to the security level indicated by access authorization by the user 134. In case of operations related to events, the computation device 104 implemented with a machine learning model may further provide instructions based on the type of the event (e.g., criticality level of event LEVEL) to the data security manager 132. In some examples, what events, what parties, what level of access (e.g., security level), or combinations thereof, are based on instructions provided by the user 134 prior to an event.

Responsive to the instructions based on the security level indicated by the user 134 or the type of the event indicated by the computer device 104, the data security manager 132 may grant appropriate parties access to appropriate data. For example, if either the security level is indicative of low (e.g., LEVEL 1) or the type of the event has a low criticality level (e.g., LEVEL 1), the data security manager 132 may grant the parties 136 and 138 access to low security level of data in the data partition 128 using the key KEY1 without granting access to the high security level of data in the data partition 130. In another example, if either the security level is indicative of high (e.g., LEVEL 2) or the type of the event has a high criticality level (e.g., LEVEL 2), the data security manager 132 may grant the party 138 access to high security level data in the data partition 130 using the key KEY2_d, and further grant the parties 136 and 138 access to low security level of data in the data partition 128 using the key KEY1.

Any cryptography algorithm that provides strong security and low computation may be used for encryption and decryption of security data. In some examples, a cryptography algorithm, such as Advanced Encryption Standard (AES), Nth degree truncates polynomial ring (NTRU), Data Encryption Standard (DES), RSA, etc. may be used for the encryption and the decryption. In some examples, low security level of data may be encrypted and decrypted using symmetric encryption and decryption with a common secret key, and high security level of data may be encrypted and decrypted using asymmetric encryption and decryption, using different keys to encrypt and decrypt the data.

Figure 2:
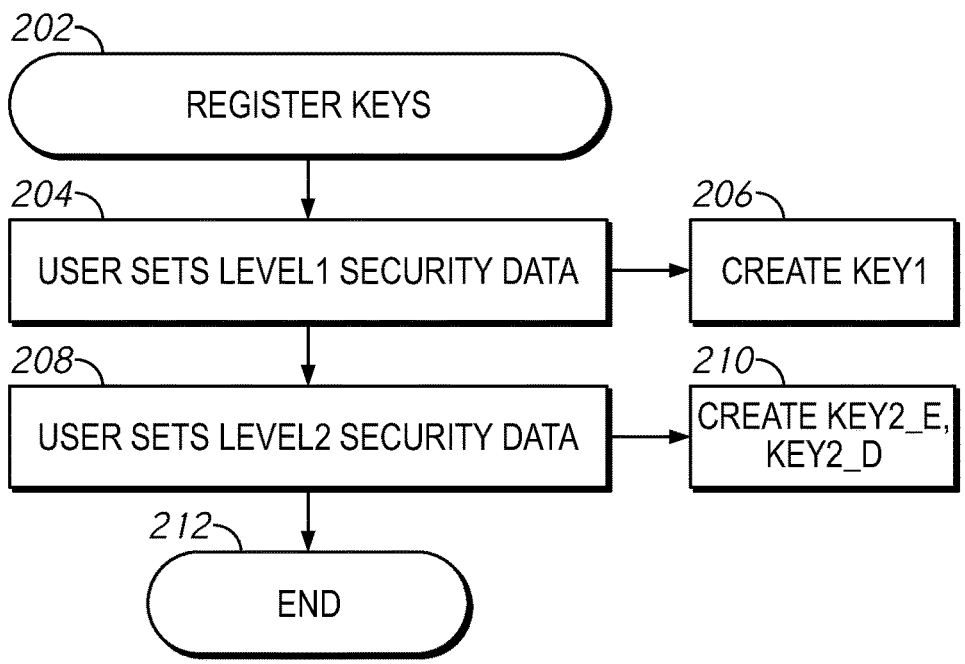
FIG. 2 is a flowchart of a method of key registration in accordance with examples of the present disclosure.

FIG. 2 is a flowchart of a method of key registration 202 in accordance with examples of the present disclosure. In some examples, as shown in FIG. 2, several keys may be generated according to several respective security levels. In step S204, a user, such as the user 134, may set level1 security data. In some examples, the level1 security data may be low security level of data. Responsive to the step S204, the data security manager 132 may generate a key KEY1 in step S206. In some embodiments, the key KEY1 may be a key which may be used for symmetric encryption and decryption to be kept private and secured. In step S208, the user, such as the user 134, may set level2 security data. In some examples, the level2 security data may have a higher security level than the security level of the level1 security data. Responsive to the step S208, the data security manager 132 may generate a key for encryption KEY2_E and a key for decryption KEY2_D in step S210. In some embodiments, the key for decryption KEY2_D which may be used for asymmetric encryption and decryption. For example the key for decryption KEY2_D may be generated based on an assumed recipient and kept private and secured.

Figure 3:
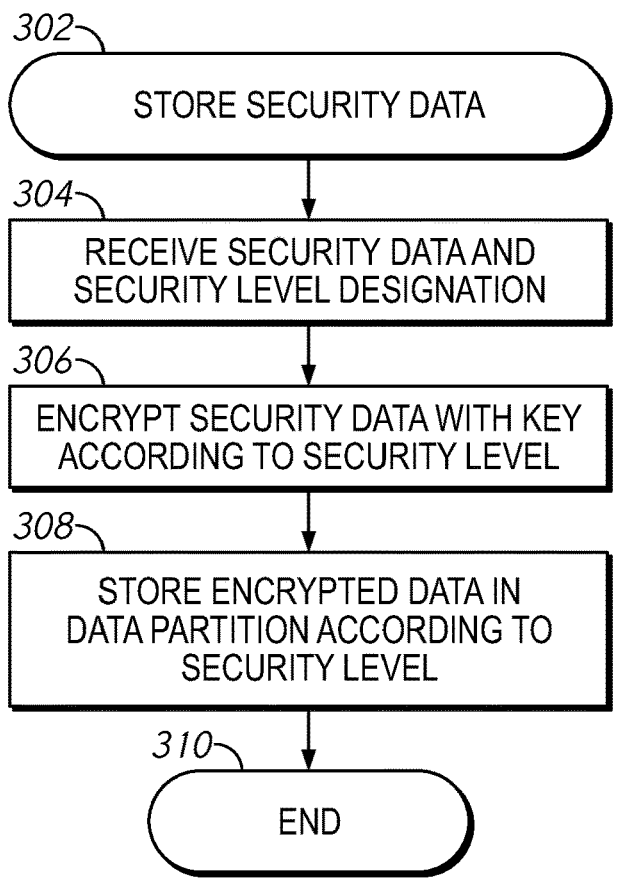
FIG. 3 is a flowchart of a method of storing security data in accordance with examples of the present disclosure.

As previously described, the data partitions 128 and 130 may store different security levels of data. FIG. 3 is a flowchart of a method of storing security data 302 in accordance with examples of the present disclosure. For example, the data partition 128 may store low security level of data and the data partition 130 may store high security level of data. In step S304, the memory device 122 may receive data together with security level designation for the data from the user 134. In some examples, the data may be provided by the computing device 104 or from other external apparatuses controlled by parties 136 and 138, together with the security level designation by the user 134. In step S306, the data security manager 132 may encrypt the data with a key according to the designated security level. In some examples, the low security level of data may be encrypted using symmetric encryption with the key KEY1 and the high security level of data may be encrypted using asymmetric encryption with the key KEY2_E. In step S308, the data security manager 132 may grant storing the encrypted data in a data partition according to the designated security level. For example, the encrypted low security level of data may be stored in the data partition 128 and the encrypted high security level of data may be stored in the data partition 130.

As described in reference to FIGS. 2 and 3, during normal operation, the user 134 controls the data stored in the data partitions 128 and 130 and controls which parties, such as parties 136 and 138, have which levels of access (if any) to the memory 126. For example, as noted, in some examples, the user 134 may provide authorization commands. However, in some examples, under certain conditions (e.g., the occurrence of an event), the user 134 may wish to grant access to a party, such as party 136 and/or 138 to data partition 128 and/or data partition 130 even though the user 134 is not available to provide the authorization command. For example, when user 134 is in a car accident, the user 134 may wish to grant party 136 access to data partitions 128 and 130 and grant party 138 access to data partition 128 even if user 134 is not capable of providing an authorization command to the memory device 122.

In some examples, user 134 may provide instructions to memory device 122 as to under what conditions (e.g., events, severity/type of event) which parties should receive access to which partitions of the memory device 122 even absent an authorization command from user 134. These instructions may be stored in partition 128, partition 130, and/or a memory located within the data security manager 132.

In some examples, whether or not an event has occurred and/or a criticality of the may be determined based, at least in part, by data provided by one or more sensors, such as sensors 102. In some examples, a machine learning model may be used to analyze the data from the sensors 102 to determine whether an event has occurred and/or the criticality of the event. In some examples, the machine learning model may determine, at least in part, when and what level of access to the data partitions 128 and 130 of the memory 112 should be granted to party 136 and/or 138.

Figure 4:
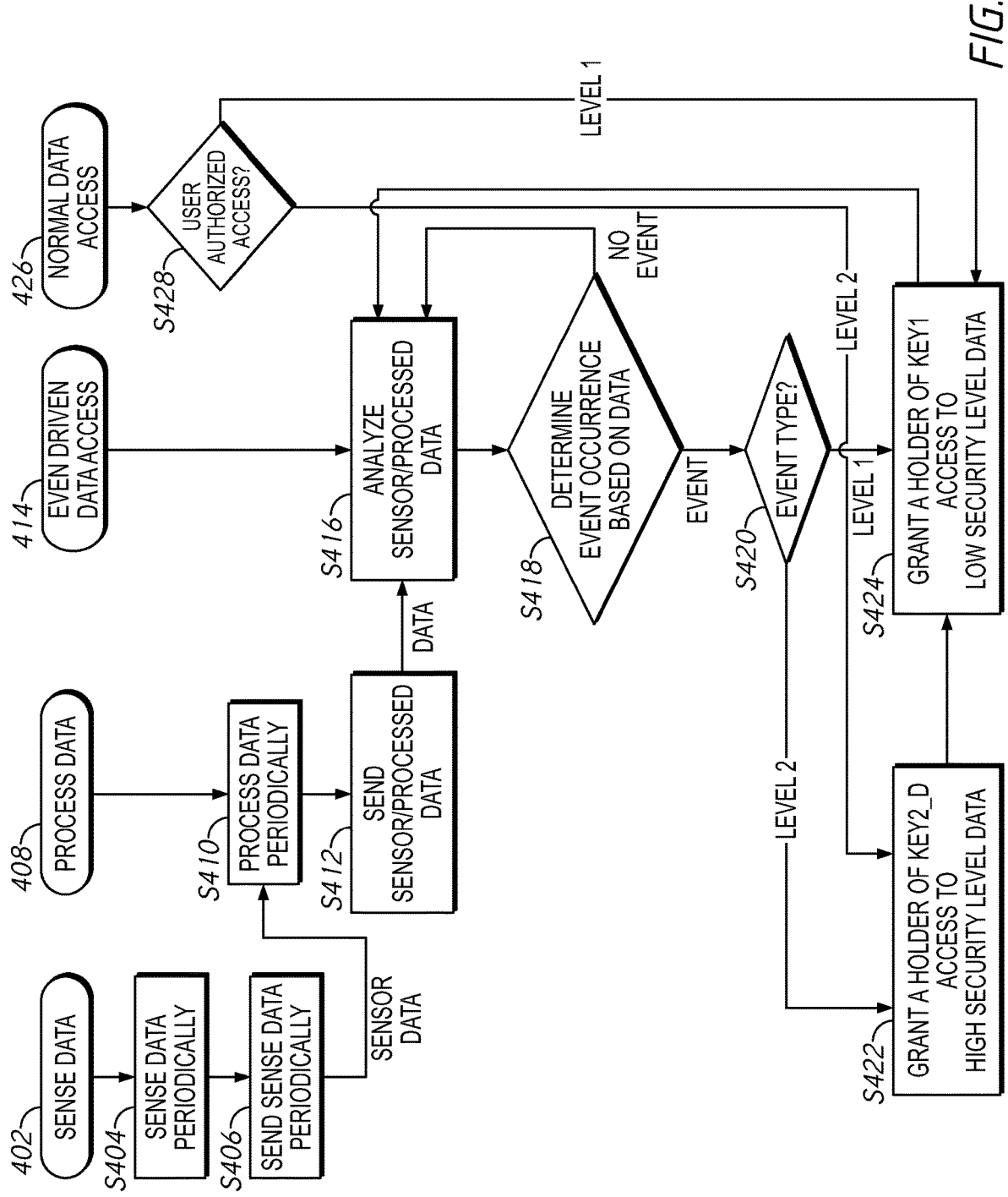
FIG. 4 is a flowchart of a method of determining event types and granting security data access in accordance with examples of the present disclosure.

In some examples, the computing device 104 may determine event occurrence based on sensor data from the sensors 102. According to an event type of the event occurred, a level of criticality may be determined. Based, at least in part, on the determination of the event occurrence and/or its criticality, the computing device 104 may send keys to appropriate parties 136 and 138 to grant access to appropriate security level(s) of data. FIG. 4 is a flowchart of a method of determining event types and granting security data access in accordance with examples of the present disclosure.

In some examples, the sensors 102 may periodically sense data in a process 402. In some examples, the sensors 102 may be one or more cameras and the data may be images or video captured by the cameras. In some examples, the sensors 102 may be one or more microphones, and the data may be audio recorded by the microphones. In some examples, the sensors 102 may be in a health monitor, a fitness device, a wearable device, a game controller or a steering wheel in a vehicle that may collect health-related information such as body temperature, heart rate, blood pressure, blood oxygen level, etc. In some examples, the sensors 102 may include a motion sensor in a fitness device, wearable device, game controller or telematic sensors in a vehicle that may collect telematic information such as velocity, acceleration, distance to nearby objects, GPS information, contact or potential contact, potential collision impact, airbag deployment record, etc. In step S404, the sensors 102 may periodically sense the data. If the data is sensed successfully, the data may be provided to the computing device 104 in Step S406. While the data is described as being periodic in this example, in other examples, the data may be sensed continuously by sensors 102 and/or continuously provided to the computing device 104. In other examples, the data may be sensed or provided at irregular intervals. For example, a sensor 102 that senses deployment of an airbag may only provide information to the computing device 104 when deployment of the airbag is detected.

In some examples, the computing device 104 may periodically process data in a process 408. However, in other examples, the computing device 104 may continuously process the data or process the data at irregular intervals. In some examples, the computing device 104 in a mobile device, as described earlier. In some examples, the computing device 104 may be in a smart phone, cell phone, gaming device, tablet, fitness device or head unit in a vehicle that may process various information in Step S410. In some examples, the various information may include the sensor data from the sensors 102, such as health-related information or telematic information. After processing various information, the computing device 104 may generate processed data, such as health condition alert information related to the health condition of the user 134 that may invite attention of medical professionals, and/or drive safety alert information, such as potential collision, potential vehicle defects, driving behavioral issues, or hazardous road condition information. In some examples, the computing device 104 may be implemented with a machine learning model that is trained to provide the processed data such as health condition alert information and/or drive safety alert information based on the raw sensor data. In step S412, the computing device 104 may provide a process 414 with the raw sensor data and/or the processed data.

In some examples, the computing device 104 and/or the data security manager 132 may manage security data access based on events in the process 414. In the step S416, the computing device 104 may analyze the sensor data and/or the processed data. In some examples, the computing device 104 may be implemented with a machine learning model that is trained to analyze the sensor data and/or the processed data. In some examples, the raw sensor data may include health-related information such as body temperature, heart rate, blood pressure, blood oxygen level, etc., and/or telematic information such as velocity, acceleration, distance to nearby objects, GPS information, contact or potential contact, potential collision impact, airbag deployment record, etc. In some examples, the processed data may include the health condition alert information and/or the drive safety alert information based on the raw sensor data generated by the computing device 104.

In step S418, the computing device 104 may determine whether any event that may cause access to security data has occurred based on the raw sensor data and the processed data. In some examples, the computing device 104 may be implemented with a machine learning model that is trained to determine the occurrence of the event. For example, such event may be more or less critical health conditions of the user 134 that may trigger attention of medical professionals, such as high likeliness of heart attack, stroke, seizure, excess bleeding, injuries and/or more or less critical driving conditions of the user 134, such as potential collision, potential vehicle defects, driving behavioral issues, or hazardous road condition information that may trigger accident preventive actions, or traffic conditions that may trigger efficient routing and navigation to save time and/or fuel. In some examples, the computing device 104 may be implemented with a machine learning model that has been trained to use the raw sensor data and/or the processed data such as health condition alert information and/or drive safety alert information as input and make inferences about the events. If the computing device 104 determines that no event that may cause access to security data has occurred, the computing device 104 may keep receiving the sensor data in step S416. If the computing device 104 determines that an event that may cause access to security data has occurred, the computing device 104 may further determine a type of the event in step S418. Based on the type of the event, the computing device 104 may provide the data security manager 132 with instructions based on the type of the event in step S418. For example, if the event is determined as a relatively low criticality (LEVEL 1 of FIG. 4), such as minor health symptoms, minor injuries, less critical vehicle defects, minor driving behavioral issues, or normal traffic jam during rush hours, the computing device 104 may provide the instructions indicative of the relatively low criticality (LEVEL 1). For example, if the event is determined as a relatively high criticality (LEVEL 2 of FIG. 4) above a criticality threshold, either predetermined or determined by the machine learning model, such as major health symptoms, such as heart attack, stroke, seizure, excess bleeding, major injuries, critical vehicle defects, or major driving behavioral issues such as DUI and dangerous driving, the computing device 104 may provide the instructions indicative of the relatively high criticality (LEVEL 2).

Responsive to the instructions, the data security manager 132 may determine the scope of security data access that is granted to parties, including the parties 136 and 138 in step S420. For example, if the event is determined as a relatively low criticality (LEVEL 1 of FIG. 4), the data security manager 132 may grant a holder of KEY1, including the parties 136 and/or 138, access to low security level of data in the data partition 128, without granting access to high security level of data in the data partition 130 in step S424. For example, the party 138 may have access to low security level of data in the data partition 128 and the party 136 may have no access to the memory device 122, if the user 134 had authorized the party 136 to hold appropriate keys to access security data, and either the computing device 104 or the data security manager 132 has provided the parties, including the parties 136 and 138 with the appropriate keys prior to the LEVEL 1 event.

In another example, if the event is determined as a relatively high criticality (LEVEL 2 of FIG. 4) above a criticality threshold, the data security manager 132 may grant a holder of KEY2_D, including the party 138, access to high security level of data in the data partition 130 in step S422, and further grant holders of KEY1, including the parties 136 and 138, access to low security level of data in the data partitions 128 in step S424.

In some examples, the data security manager 132 may manage security data access based on authorization by the user 134 in a process 426. For example, the data security manager 132 may check whether the user 134 has requested to authorize access security data to the parties in step S428. If there is authorization command by the user 134 indicative of a security level, the data security manager 132 may provide the parties, including the parties 136 and 138 with the appropriate access to the data partitions 128 and/or 130. For example, when the data security manager 132 receives an authorization request from the user 134 indicative of granting access to high security level of data, the data security manager 132 may grant a holder of KEY2_D, including the party 138, access to high security level of data in the data partition 130 in step S422. Then the data security manager 132 may further grant holders of KEY1, including the parties 136 and 138, access to low security level of data in the data partition 128 in step S424. In another example, when the data security manager 132 receives an authorization request from a user indicative of granting access to low security level of data only, the data security manger 132 may grant holders of KEY1, including the parties 136 and 138, access to low security level of data in the data partition 128 in step S424 without granting access to the high security level of data.

The flow chart shown in FIG. 4 is provided merely as an example and the present disclosure is not limited to the processes 402, 408, 414 and 426. For example, the events may be classified into three or more criticality levels. The events may be classified into different classes (e.g., medical, traffic, house security, personal security, etc.) and/or criticality levels by manual definition prior to train the machine learning model, or the classes and levels generated by the machine learning model. Based on classifications by the computing device 104, the scope of access may be determined by the data security manager 132. In some examples, the machine learning model may include different machine learning models for different applications. For example, there may be a machine learning model for determination of the events and a separate machine learning model for classification of the events.

Furthermore, there may be additional partitions and/or the partitions are stored at different levels of security in other examples. In other examples, more or different parties may receive different access levels under different conditions than those provided in the example shown in FIG. 4. For example, there may be three or more parties that receive access to partition 128 for certain events, but do not receive access to partition 130. In another example, two or more parties may receive access to both partitions 128 and 130 for certain events.

In some examples, the machine learning model in the computing device 104 may be further trained through the received sensor data and processed data. In some examples, training a machine learning model may be performed while managing data access in the computing device 104. In some examples, training the machine learning model may be performed in the cloud computing device 140 communicatively coupled to the computing device 104. The computing device 104 may transmit the sensor data and the processed data with time stamps to the cloud computing device 140. The cloud computing device 140 may store the sensor data and the processed data and train the machine learning model using the sensor data and the processed data. The trained machine learning model may be provided as an update to the computing device 104, and stored in the computer readable medium 106 to include the update in the executable instructions 118. This arrangement may be more convenient for when the machine learning model is dynamically trained when the computing device 104 may have limited resources to train the machine learning model.

Figure 5:
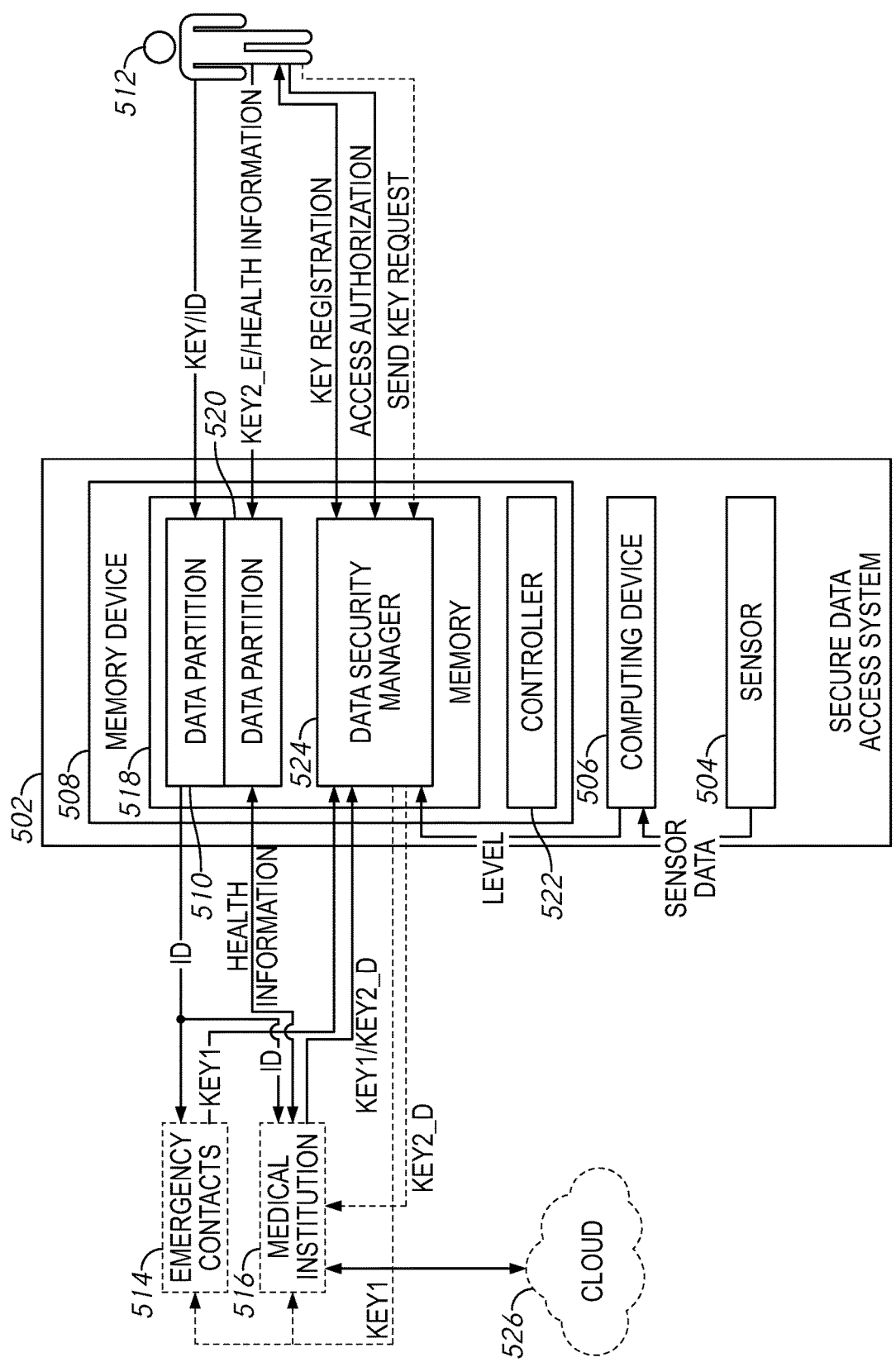
FIG. 5 is a schematic illustration of a secure data access system in accordance with examples of the present disclosure.

FIG. 5 is a schematic illustration of a secure data access system 502 in accordance with examples of the present disclosure. The secure data access system 502 may include one or more sensors 504, a computing device 506, and a memory device 508 that is a secure memory device. In some examples, the secure data access system 502 may be included in an on-site security system or a mobile device, such as a smart phone, cell phone, gaming device, tablet, a wearable device such as a fitness device, health monitor. In other examples, any of the one or more sensors 504, the computing device 506, or the memory device 508 may be located remotely from the rest of the secure data access system 502.

In some examples, the one or more sensors 504 may be an accessory devices, such as monitoring devices that communicate with the computing device 506. In other examples, the one or more sensors 504 may be an integral element of the secure data access system 502, for example, sensors on a smart phone, sensors in a portable or wearable device such as a fitness device or a game controller, or sensors in a vehicle. In some examples, the sensors 102 may include, for example, one or more cameras, a touch screen of a smart phone, one or more microphones, health-related sensors, motion sensors, telematic sensors such as speedometers, accelerometers, gyros, shock detectors, infra-red sensors, haptic sensors on a steering wheel, etc.

In some examples, the computing device 506 may be implemented wholly or partially using a computer. In some examples, the computing device 506 may be implemented as a computing device similar to the computing device 104 that has been earlier described with referring FIG. 1, thus the description of functionalities of the computing device 506 is not repeated.

In some examples, the memory device 508 may include a memory controller 522 and one or more memories 126. Optionally, in some examples, the memory device 508 may include a communication interface, similar to the communication interface 114 in the computing device 104 (not shown). The memory controller 522 may provide basic access control of data in the memory 518. The memory controller 522 may handle memory access operations, such as write, read, precharge, refresh etc., responsive to communication initiated outside the memory device 508.

The memory 518 may include a data security manager 524 and the data partitions 510 and 520. In some examples, the data security manager 524 may be implemented as a computing device similar to the computing device 506. In some examples, the memory controller 522 may be integrated with the data security manager 524. In some examples, any of the data security manager 524 and the memory controller 522 may be integrated with one or more processors in the computing device 506. The data security manager 524 may include one or more processors using one or more central processing units (CPUs), graphical processing units (GPUs), application specific integrated circuits (ASICs), field programmable gate arrays (FPGAs), and/or other processor circuitry together with a portion of the data partitions 510 and 520 as a computer readable medium storing executable instructions and data. For example, a program related to key generation, encryption and decryption associated with high security level of data may be stored in the data partition 520. Keys for encryption and keys for decryption may also be stored in the data partition 520. In some examples, the data partition 520 may include genomic data (e.g., genetic sequence data, gene expression data, etc.) and medical history of the user 512. For example, a program related to key generation, encryption and decryption associated with low security level of data may be stored in the data partition 510. Keys for encryption and decryption may also be stored in the data partition 510. In some examples, the programs may be stored in another memory and/or memory partition dedicated for programs separate from the data partitions 510 and 520.

In some examples, the data security manager 524 may control access data in the data partitions 510 and 520 instructed by the memory controller 522. The data partitions 510 and 520 may provide information and/or receive information via the memory controller 522 in some examples. While two data partitions 510 and 520 are shown, any number of data partitions may be used.

High security level of data, such as health information of a user 512 provided by the user 512 and/or the medical institution 516 may be stored to accumulate medical record of the user 512 in the data partition 520. Low security level of data, such as an identifier (ID) of the user 512, may be stored in the data partition 510. In some embodiments, the user 512 may initially register and the data security manager 524 may generate one or more keys to access different security levels of data under the control by the user 512. In some examples shown in FIG. 5, the data security manager 524 may generate keys KEY1, KEY2_E and KEY2_D when the user 512 registers. The key KEY1 may be used for encryption and decryption of low security of data stored in the data partition 510. The key KEY2_E may be used for encryption of the high security level of data stored in the data partition 520. The key KEY2_D may be used for decryption of the high security level of data stored in the data partition 520. In some examples, the data security manager 524 may provide the user 512 with the key KEY1 and the key KEY2_E. In some examples, the data security manager 524 may provide the user 512 with access login which enables the user 512 to encrypt data uploaded by the user 134 with the keys KEY1 and KEY2_E stored in the memory 518. In some examples, the data security manager 524 may provide emergency contacts 514 with the key KEY1 and may further provide a medical institution 516 (e.g., a hospital, a clinic, a visiting doctor) with the key KEY2_D and the key KEY1 per request from the user 512. The emergency contacts 514 may be granted access to low security level of data, such as the ID of the user 512 in the data partition 128 using the key KEY1. The medical professionals of the medical institution 516 may be granted access to high and low security levels of data, such as health information in the data partition 510 and the ID in the data partition 520 using the keys KEY1 and KEY2_D. In some examples, the health information in the data partition 510 may include another key to access even higher security level of data stored in a cloud computing device 526.

During normal operation, the user 512 controls the data stored in the data partitions 510 and 520 and controls which parties, such as emergency contacts 514 and medical institutions 516 have which levels of access (if any) to the data security manager 524 in the memory 518. For example, as noted, in some examples, the user 512 may provide the data security manager 524 with access authorization commands indicative of security level of data to grant access.

However, in some examples, under certain conditions (e.g., the occurrence of an event), the user 512 may wish to grant access to a party, such as emergency contacts 514 and/or medical institution 516 to data partition 510 and/or data partition 520 even though the user 512 is not available to provide the authorization command. In some examples, user 512 may provide instructions to the data security manager 524 of the memory device 508 as to under what conditions (e.g., events, severity/type of event) which parties should receive access to which partitions of the memory device 508 even absent an authorization command from user 512. These instructions may be stored in partitions 510 and 520, and/or a memory located within the data security manager 524.

In some examples, whether or not an event has occurred and/or a criticality of the may be determined based, at least in part, by data provided by one or more sensors, such as sensors 504. In some examples, a machine learning model implemented in the computing device 506 and/or the data security manager 524 may be used to analyze the data from the sensors 504 to determine whether an event has occurred and/or the criticality of the event. In some examples, genomic data and medical history of the user 512 in the data partition 520 may also be used to train the machine learning model. The machine learning model may also analyze genomic data and medical history of the user 512 together with the data from the sensor 504 to determine the occurrence of the event. In some examples, the machine learning model may determine, at least in part, when and what level of access to the memory device 508 should be granted to emergency contacts 514 and/or medical institutions 516.

For example, when the user 512 is experiencing a life threatening event, the user 512 may wish to grant medical institutions 516 access to data partitions 510 and 520 and grant emergency contacts 514 access to data partition 510 even if user 512 is not capable of providing an authorization command to the data security manager 524 in the memory device 508. In case of operations related to events, the computing device 506 and/or the data security manager 524 implemented with a machine learning model may determine a current condition (e.g., events, severity/type of event), and if the current condition is one of the conditions instructed by the user 512, the computing device 506 may provide instructions based on the type of the event (e.g., criticality level of event LEVEL) to the data security manager 524.

Responsive to the access authorization commands based on the security level indicated by the user 512 or the instructions indicative of the type of the event indicated by the computing device 506, the data security manager 524 may grant appropriate parties access to appropriate data. For example, if either the security level is indicative of low (e.g., LEVEL 1) or the type of the event has a low criticality level (e.g., LEVEL 1), the data security manager 524 may grant the emergency contacts 514 and medical institutions 516 access to an ID in the data partition 510 using the key KEY1 without granting access to health information in the data partition 520. In another example, if either the security level is indicative of high (e.g., LEVEL 2) or the type of the event has a high criticality level (e.g., LEVEL 2), the data security manager 524 may grant the medical institutions 516 with the key KEY2_D access to the health information in the data partition 520, and further grant the emergency contacts 514 and medical institutions 516 with the key KEY1 access to the ID in the data partition 510. The medical institutions 516 may access the genomic data and the medical history of the user 512 in the data partition 520, and may be able to provide appropriate medication based on the genome sequencing data per user and medical history. Furthermore, medication record may be added to the data partition 520 to improve the machine learning model.

Figure 6:
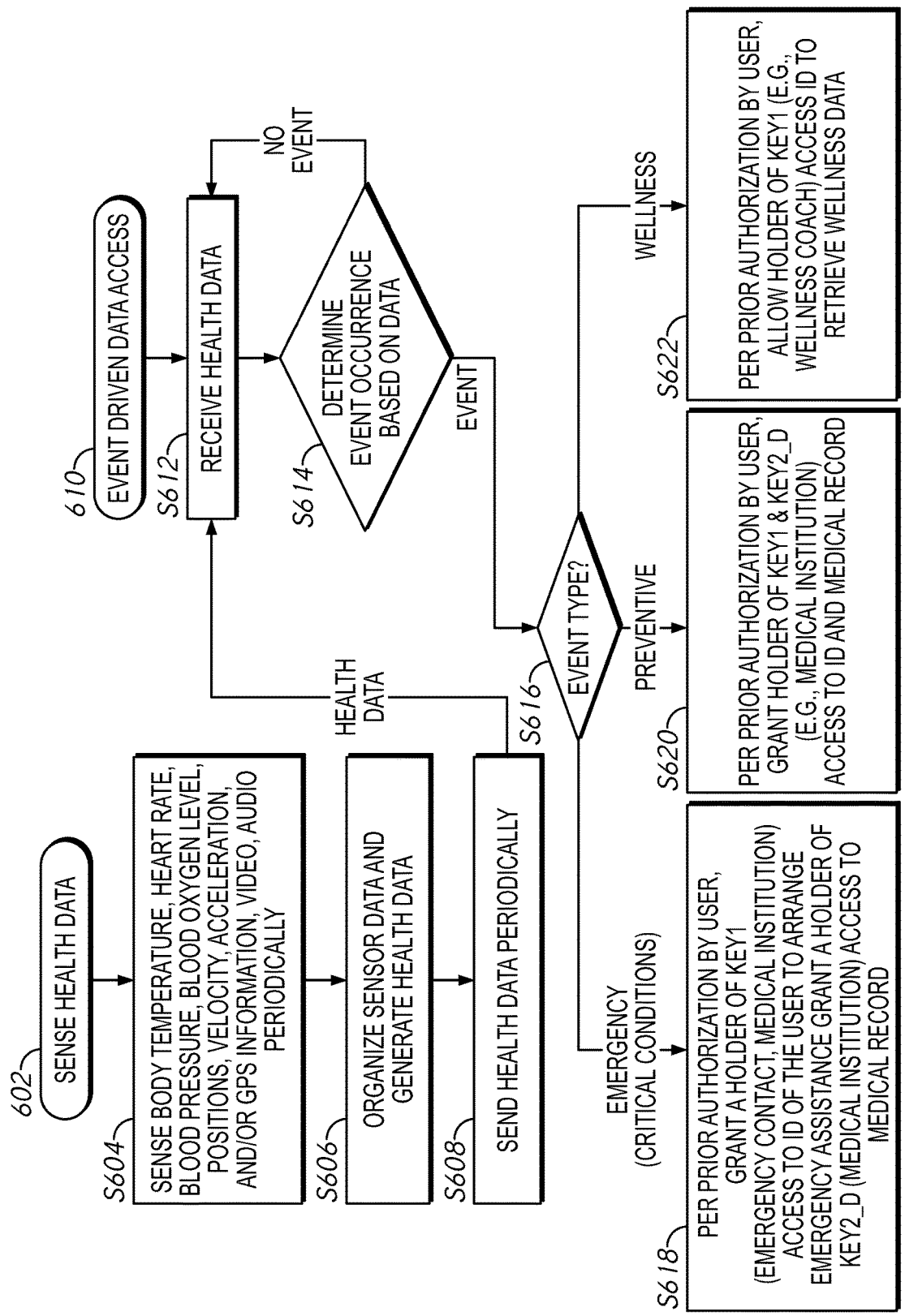
FIG. 6 is a flowchart of a method of determining event types and granting security data access in accordance with examples of the present disclosure.

In some examples, the data security manager 524 may determine event occurrence based on sensor data from the sensors 504. According to an event type of the event occurred, a level of criticality may be determined. The data security manager 524 may send keys to appropriate parties, such as emergency contacts 514 and/or medical institutions 516 to grant access to appropriate security level(s) of data according to the level of criticality. FIG. 6 is a flowchart of a method of determining event types and granting security data access in accordance with examples of the present disclosure.

In some examples, the sensors 504 may periodically sense data in a process 602. In some examples, the sensors 504 may be one or more cameras and the data may be images or video captured by the cameras. In some examples, sensors 504 may be one or more microphones, and the data may be audio recorded by the microphones. In some examples, the sensors 504 may be in a health monitor, a fitness device, a wearable device, a game controller or a steering wheel in a vehicle that may collect health-related information such as body temperature, heart rate, blood pressure, blood oxygen level, etc. In some examples, the sensors 504 may include a motion sensor in a fitness device, wearable device, or game controller that may collect information related to exercise, such as velocity, acceleration, distance to nearby objects, GPS information, contact or potential contact, potential collision impact, airbag deployment record, etc. In step S604, the sensors 504 may periodically sense the data. If the data is sensed successfully, the sensors 504 may organize the sensor data and generate health data in step S606. The health data may include raw data, such as body temperature, heart rate, blood pressure, blood oxygen level. The health data may further include an exercise amount which may be computed using the information related to exercise, such as velocity, acceleration, distance to nearby objects, GPS information, contact or potential contact, potential collision impact, airbag deployment record, etc. The health data may be provided to the computing device in Step S608. While the data is described as being periodic in this example, in other examples, the data may be sensed continuously by sensors 504 and/or continuously provided to the computing device 506. In other examples, the data may be sensed or provided at irregular intervals. For example, a sensor 504 that senses anomaly may only provide information to the computing device 506 when such anomaly is detected.

In some examples, the data security manager 524 may manage security data access based on events in a process 610. In the step S612, the computing device 506 and/or data security manager 524 in the memory device 508 may receive the health data from the sensors 504. In step S614, the computing device 506 and/or data security manager 524 may determine whether any event that may cause access to security data has occurred based on the health data. For example, such event may be more or less critical health conditions of the user 512 that may trigger attention of medical professionals, such as high likeliness of heart attack, stroke, seizure, excess bleeding, injuries and/or more or less critical surrounding conditions of the user 512, such as potential collision, fall, extreme atmosphere temperature that may trigger illness or injury preventive actions, or wellness information based on exercise information that may be useful for the user 512. In some examples, the computing device 506 and/or data security manager 524 may be implemented with a machine learning model that has been trained to use the health data from the sensors 504 as input and make inferences about the events. In some examples, the machine learning model has been further trained to use and the genomic data and the medical history of the user 512 in the data partition 520. For example, the genomic data and/or medical history of the user 512 may be used to train the machine learning model to determine an event and/or a criticality of the event. If the computing device 506 and/or data security manager 524 determines that no event that may cause access to security data has occurred, the computing device 506 and/or data security manager 524 may continue receiving health data in step S612. If the computing device 506 and/or data security manager 524 determines that an event that may cause access to security data has occurred in step S614, the data security manager 524 may further determine a type of the event in step S616. Based on the type of the event, the data security manager 524 may determine the scope of security data access that is granted to parties, including the medical institutions 516 and the emergency contacts 514.

For example, if the event is determined as a relatively high criticality, such as emergency with critical conditions showing major health symptoms, such as heart attack, stroke, seizure, excess bleeding, major injuries, the data security manager 524 may grant a holder of KEY1, including the emergency contacts 514 and the medical institutions 516, access to low security level of data, such as the ID of the user 512 in the data partition 510, and further grant a holder of KEY2_D, including the medical institutions 516, access to high security level of data, such as medical record in the data partition 520, such as the genomic data and the medical history of the user 512 under the prior authorization by the user 512 in step S618.

For example, if the event is determined as a relatively low criticality, such as minor health issues which may be handled with preventive care, the data security manager 524 may grant a holder of KEY1 and KEY2_D, such as the medical institutions 516, access to low security level of data, such as the ID of the user 512 in the data partition 510 and high security level of data, such as medical record of the user 512 in the data partition 520 under the prior authorization by the user 512 in step S620.

If the event is determined as very low criticality, such as wellness, the data security manager 524 may grant a holder of KEY1, such as a wellness coach (not shown in FIG. 5), access to low security level of data, such as the ID of the user 512 in the data partition 510 which may be used to retrieve wellness data under the prior authorization by the user 512 in step S622, The flow chart shown in FIG. 6 is provided merely as an example and the present disclosure is not limited to the processes 602 and 610. For example, the events may be classified into two or four or more criticality levels. The events may be classified into different classes and/or criticality levels by manual definition prior to train the machine learning model, or the classes and levels generated by the machine learning model. Based on classifications, the scope of access may be determined by the data security manager 524. In some examples, the machine learning model may include different machine learning models for different applications. For example, there may be a machine learning model for determination of the events and a separate machine learning model for classification of the events.

In some examples, the machine learning model in the data security manager 524 may be further trained through the received sensor data and processed data. In some examples, training a machine learning model may be performed while managing data access in the data security manager 524. In some examples, training the machine learning model may be performed in a cloud computing device (not shown) communicatively coupled to the data security manager 524. In some examples, training the machine learning model may be performed using a plurality of secure data access system 502 connected on the Internet. The data security manager 524 may transmit the health data with time stamps to the cloud computing device or data center that communicates with the plurality of secure data access system 502 of a plurality of users 512. The cloud computing device or the data center may store the health data and train the machine learning model using the health data. The trained machine learning model may be provided as an update to the memory device 508, and stored in appropriate data partition of the data partitions 510 and 520. This arrangement may be more convenient for when the machine learning model is dynamically trained when the data security manager 524 may have limited resources to train the machine learning model.

Figure 7:
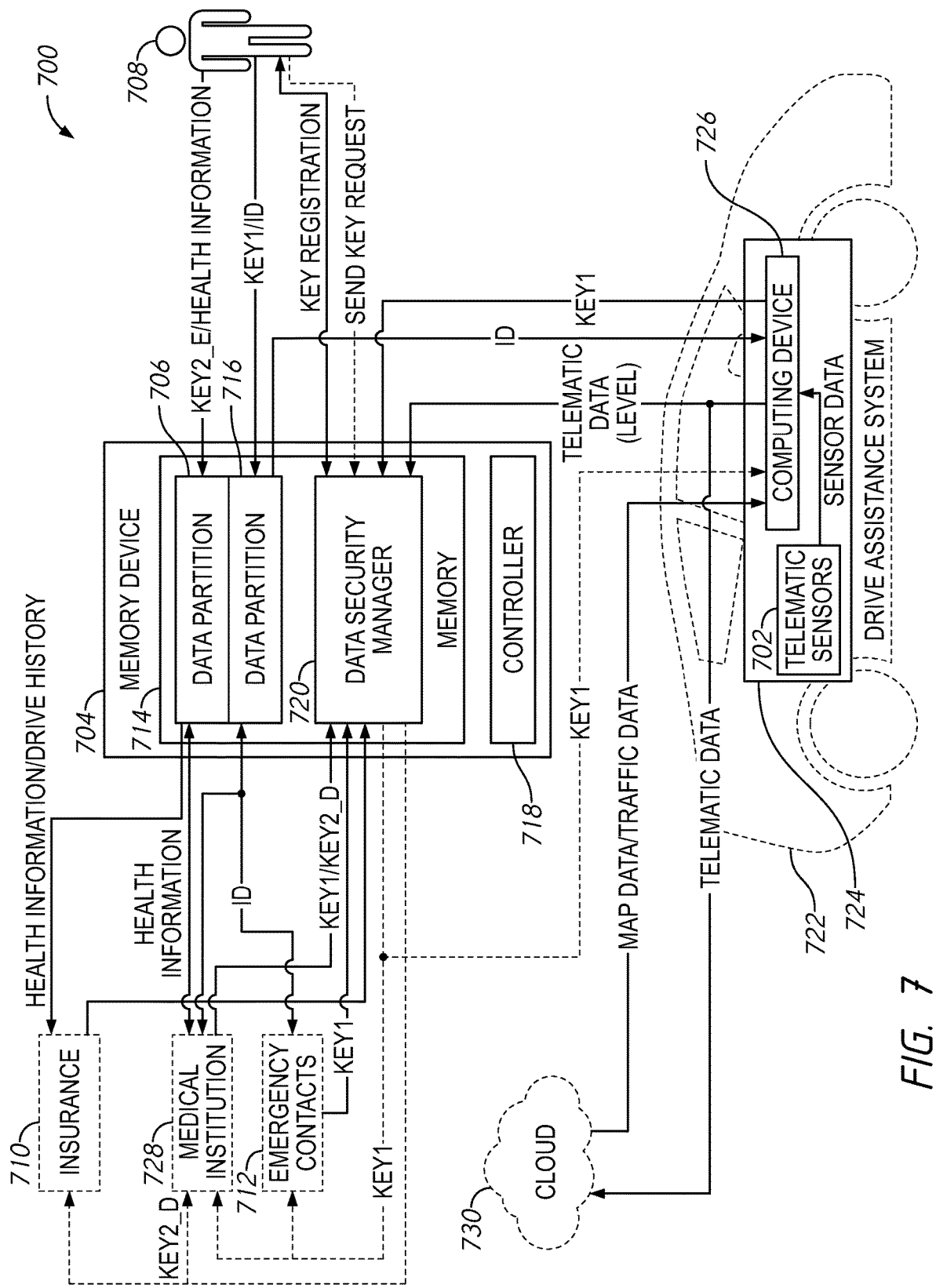
FIG. 7 is a schematic illustration of a system including a secure memory device in accordance with examples of the present disclosure.

FIG. 7 is a schematic illustration of a secure data access system 700 in accordance with examples of the present disclosure. The secure data access system 700 may include a drive assistance system 724 in a vehicle 722 and a memory device 704 that is a secure memory device. In some examples, the memory device 704 may be included in an on-site security system or a mobile device, such as a smart phone, cell phone, gaming device, tablet, a wearable device. In some examples, the memory device 704 may be an integral element of the vehicle 722.

In some examples, the drive assistance system 724 may include a computing device 726 and the one or more telematic sensors 702. The telematic sensors 702 may be accessory devices, such as monitoring devices that communicate with the computing device 726. In some examples, the telematic sensors 702 may include, for example, one or more cameras, a touch screen of the drive assistance system 724, one or more microphones, motion sensors, such as speedometers, accelerometers, gyros, shock detectors, infrared sensors, haptic sensors on a steering wheel, etc., installed in the vehicle 722. The telematic sensors 702 may also monitor actions on a steering wheel, a gas pedal, a brake pedal, gear shift knobs, etc.

In some examples, the computing device 726 may be implemented wholly or partially using a computer. In some examples, the computing device 726 may be implemented as a computing device similar to the computing device 104 that has been earlier described with referring FIG. 1, thus the description of basic functionalities of the computing device 726 is not repeated. The computing device 726 may process sensor data from the telematic sensors 702 and generate telematic data, such as driving record, positional data, safety data, vehicle analysis data, etc.

Optionally, the drive assistance system 724 may communicate with a cloud computing device cloud computing device 730. The drive assistance system 724 may receive map data and traffic data from the cloud computing device 730. The drive assistance system 724 may send the telematic data to the cloud computing device 730.

In some examples, the memory device 704 may include a memory controller 718 and one or more memories 714. Optionally, in some examples, the memory device 704 may include a communication interface, similar to the communication interface 114 in the computing device 104 (not shown). The memory controller 718 may provide basic access control of data in the memory 714. The memory controller 718 may handle memory access operations, such as write, read, precharge, refresh etc., responsive to communication initiated outside the memory device 704.

The memory 714 may include a data security manager 720 and the data partitions 706 and 716. In some examples, the memory controller 718 may be integrated with the data security manager 720. The data security manager 720 may include one or more processors using one or more central processing units (CPUs), graphical processing units (GPUs), application specific integrated circuits (ASICs), field programmable gate arrays (FPGAs), and/or other processor circuitry together with a portion of the data partitions 706 and 716 as a computer readable medium storing executable instructions and data. For example, a program related to key generation, encryption and decryption associated with high security level of data may be stored in the data partition 706. Keys for encryption and keys for decryption may also be stored in the data partition 706. For example, a program related to key generation, encryption and decryption associated with low security level of data may be stored in the data partition 716. Keys for encryption and decryption may also be stored in the data partition 716. In some examples, the programs may be stored in and/or memory partition dedicated for programs separate from the data partitions 706 and 716.

In some examples, the data security manager 720 may control access data in the data partitions 706 and 716 instructed by the memory controller 718. The data partitions 706 and 716 may provide information and/or receive information via the memory controller 718 in some examples. While two data partitions 706 and 716 are shown, any number of data partitions may be used.

High security level of data, such as health information and drive history of a user 708 provided by the user 708 and telematic data provided by the drive assistance system 724 in the vehicle 722 may be stored to accumulate medical record and drive history of the user 708 in the data partition 706. In some examples, the data partition 706 may include the health information, such as genomic data and medical history of the user 708. Low security level of data, such as an identifier (ID) of the user 708, may be stored in the data partition 716. In some embodiments, the user 708 may initially register and the data security manager 720 may generate one or more keys to access different security levels of data under the control by the user 708. In some examples shown in FIG. 7, the data security manager 720 may generate keys KEY1, KEY2_E and KEY2_D when the user 708 registers. The key KEY1 may be used for encryption and decryption of low security of data stored in the data partition 716. The key KEY2_E may be used for encryption of the high security level of data stored in the data partition 706. The key KEY2_D may be used for decryption of the high security level of data stored in the data partition 706. The data security manager 720 may provide the key KEY1 and the key KEY2_E to the user 708. In some examples, the data security manager 720 may provide emergency contacts 712 and the vehicle 722 with the key KEY1 and may further provide a medical institution 728 (e.g., a hospital, a clinic, a visiting doctor) with the key KEY2_D and the key KEY1 per request from the user 708. The data security manager 720 may further provide insurance companies 710, such as a healthcare company and an automobile insurance company, with the key KEY2_D per request from the user 708. Thus, the medical professionals of the medical institution 728 may be granted access to high and low security levels of data, such as health information in the data partition 706 and the ID in the data partition 716 using the keys KEY1 and KEY2_D, whereas the emergency contacts 712 and the vehicle 722 may be granted access to low security level of data, such as the ID of the user in the data partition 716 using the key KEY1. The insurance companies 710 may be granted access to high security level of data, such as health information in the data partition 706.

In some examples, the user 708 may be a driver of the vehicle 722. While driving, the user 708 may not be available to provide access authorization command, and the user 708 may wish to grant access to a party, such as the vehicle 722, emergency contacts 712, medical institutions 728 and/or insurance companies 710 to data partitions 706 and/or data partition 716 under certain conditions (e.g., the occurrence of an event). In some examples, the user 708 may provide instructions to the data security manager 720 of the memory device 704 as to under what conditions (e.g., events, severity/type of event) which parties should receive access to which partitions of the memory device 704 even absent an authorization command from user 708. These instructions may be stored in data partitions 706 and 716, and/or a memory located within the data security manager 720 while storing data by the user 708.

In some examples, whether or not an event has occurred and/or a criticality of the may be determined based, at least in part, by data provided by one or more sensors, such as telematic sensors 702. In some examples, a machine learning model implemented in the computing device 726 and/or the data security manager 720 may be used to analyze the data from the telematic sensors 702 to determine whether an event has occurred and/or the criticality of the event. In some examples, the machine learning model may further analyze genomic data and medical history of the user 708 to determine the occurrence of the event. In some examples, the machine learning model may determine, at least in part, when and what level of access to the memory device 704 should be granted to the vehicle 722, emergency contacts 712, medical institutions 728 and/or insurance companies 710.

For example, when the user 708 is experiencing a car accident, the user 708 may wish to grant the medical institutions 728 access to data partitions 706 and 716, grant insurance companies 710 access to the data partition 706, and grant emergency contacts 712 and the vehicle 722 access to data partition 716. In case of operations related to events, the computing device 726 and/or the data security manager 720 implemented with a machine learning model may determine a current condition (e.g., events, severity/type of event), and if the current condition is one of the conditions instructed by the user 708, the computing device 726 and/or the data security manager 720 may provide instructions based on the type of the event (e.g., criticality level of event LEVEL) to the data security manager 524.

Responsive to the instructions indicative of the type of the event indicated by the computing device 726 and/or the data security manager 720, the data security manager 720 may grant appropriate parties access to appropriate data. For example, if either the security level is indicative of low (e.g., LEVEL 1) or the type of the event has a low criticality level (e.g., LEVEL 1), the data security manager 720 may grant the vehicle 722, the emergency contacts 712 and medical institutions 728 access to an ID in the data partition 716 using the key KEY1 without granting access to health information in the data partition 706. In another example, if either the security level is indicative of high (e.g., LEVEL 2) or the type of the event has a high criticality level (e.g., LEVEL 2), the data security manager 720 may grant the medical institutions 728 with the key KEY2_D access to the health information, such as genomic data and medical history of the user 708, in the data partition 706, grant the insurance companies 710 with the key KEY2_D access to the health information and/or drive history in the data partition 706, and further grant the vehicle 722, the emergency contacts 712 and medical institutions 728 with the key KEY1 access to the ID in the data partition 716.

Figure 8:
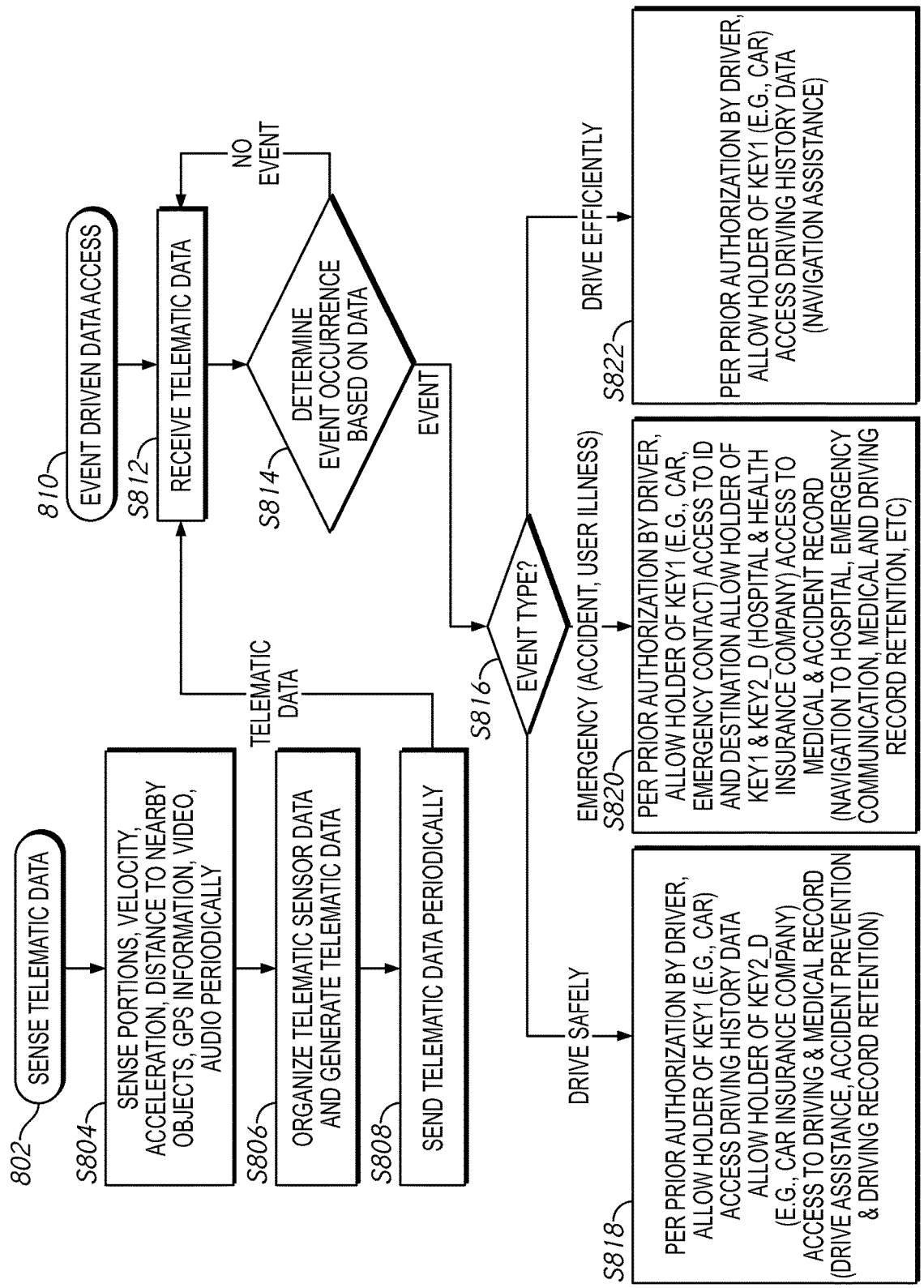
FIG. 8 is a flowchart of a method of determining event types and granting security data access in accordance with examples of the present disclosure.

In some examples, the data security manager 720 may determine event occurrence based on sensor data from the telematic sensors 702. According to an event type of the event occurred, a level of criticality may be determined. The data security manager 720 may send keys to appropriate parties, such as emergency contacts 712, medical institutions 728 and/or insurance companies 710 to grant access to appropriate security level(s) of data according to the level of criticality. FIG. 8 is a flowchart of a method of determining event types and granting security data access in accordance with examples of the present disclosure.

In some examples, the telematic sensors 702 may periodically sense data in a process 802. In some examples, the telematic sensors 702 may be one or more cameras and the data may be images or video inside and/or outside the vehicle 722 captured by the cameras. In some examples, telematic sensors 702 may be one or more microphones, and the data may be audio recorded by the microphones inside and/or outside the vehicle 722. The telematic sensors 702 may include, for example, a touch screen of the drive assistance system 724, or haptic sensors on a steering wheel that detect a driver's gesture interacting the vehicle 722 and/or the drive assistance system 724. The telematic sensors 702 may include motion sensors, such as speedometers, accelerometers, gyros, shock detectors, infra-red sensors, etc., which detect maneuvers of the vehicle 722. In some examples, the drive assistance system 724 may use sensors in a smartphone connected to the drive assistance system 724 as telematic sensors 702. For example, such telematic sensors 702 may include a health monitor, a fitness device, a wearable device that may collect health-related information such as body temperature, heart rate, blood pressure, blood oxygen level, etc. In step S804, the telematic sensors 702 may periodically sense telematic information to provide telematic sensor data. In some examples, the telematic sensor data may include images, video, audio, velocity, acceleration, distance to nearby objects, GPS information of the vehicle 722. The telematic sensors 702 may further obtain biosensor data and/or airbag deployment record of the vehicle 722. If the telematic sensor data is sensed successfully, the telematic sensors 702 may organize the telematic sensor data and generate telematic data in step S806. The telematic data may include telematic information which may be computed using the information related to driving, such as, maneuver record, contact or potential contact to the vehicle 722, potential collision impact to the vehicle 722, gesture of the driver in the vehicle 722, etc. The telematic data may also include raw data, such as images, video, audio, velocity, acceleration, distance to nearby objects, GPS information of the vehicle 722. The telematic data may be periodically provided to the computing device in Step S808. While the telematic data is described as being periodic in this example, in other examples, the telematic data may be sensed continuously by telematic sensors 702 and/or continuously provided to the computing device 726. In other examples, the data may be sensed or provided at irregular intervals. For example, a telematic sensor 702 that senses deployment of an airbag may only provide information to the computing device 726 when deployment of the airbag is detected.

In some examples, the data security manager 720 may manage security data access based on events in a process 810. In the step S812, the computing device 726 and/or the data security manager 720 in the memory device 704 may receive the health data from the telematic sensors 702. In step S814, the computing device 726 and/or the data security manager 720 may determine whether any event that may cause access to security data has occurred based on the telematic data. For example, such event may be more or less emergency driving conditions of the vehicle that may trigger attention of emergency contact 712 including family and police people, such as car accidents or disasters, or safe drive assistance based on driving behaviors, or efficient drive guidance, such as showing faster route, shorter route, energy saving acceleration and braking, etc. For example, such event may be more or less critical medical conditions of the driver that may trigger drive interventions and attention of medical professionals, such as high likeliness of heart attack, stroke, seizure, excess bleeding, and/or injuries. In some examples, the data security manager 720 may be implemented with a machine learning model that has been trained to use the telematic data as input and make inferences about the events. In some examples, the machine learning model may have been further trained using health data, such as genomic data and medical history of the user 708. For example, the genomic data and/or medical history of the user 512 may be used to train the machine learning model to determine an event and/or a criticality of the event. If the computing device 726 and/or the data security manager 720 determines that no event that may cause access to security data has occurred, the computing device 726 and/or the data security manager 720 may continue receiving telematic data in step S812. If the computing device 726 and/or the data security manager 720 determines that an event that may cause access to security data has occurred in step S814, the computing device 726 and/or the data security manager 720 may further determine a type of the event in step S816. Based on the type of the event, the data security manager 720 may determine the scope of security data access that is granted to parties, including the vehicle 722, the emergency contacts 712, medical institutions 728 and/or insurance companies 710.

For example, if the event is determined as of relatively low criticality which may trigger safe drive guidance to prevent accidents, the data security manager 720 may grant a holder of KEY1 (e.g., a vehicle 722) access to low security level of data, such as the ID of a driver that is the user 708 in the data partition 716 under authorization by the user 708 in step S818 per prior authorization by the user 708. The data security managers 720 may further grant a holder of KEY1 and KEY2_D, such as car insurance company 710, access to low security level of data, such as the ID of the user 708 in the data partition 716 and high security level of data, such as driving and medical record of the user 708 in the data partition 706 under authorization by the user 708 in step S818 per prior authorization by the user 708.

For example, if the event is determined as of relatively high criticality, such as emergency with critical conditions showing a high likeliness of a major car accident and/or health symptoms, the data security manager 720 may send the key KEY1 to the emergency contacts 712 and the vehicle 722 and further send the keys KEY1 and KEY2_D to the medical institutions 728 and health insurance company 710 in step S820 per prior authorization by the user 708. Then the data security manager 720 may grant a holder of KEY1, including the emergency contacts 712, the medical institutions 728 and the vehicle 722 access to low security level of data, such as the ID of the user 708 and IDs of potential destinations, such as IDs of hospitals including emergency rooms associated with the user's health insurance company in the data partition 716, and further grant a holder of KEY2_D, including the medical institutions 728, access to high security level of data, such as medical record and accident record in the data partition 706 per prior authorization by the user 708 in step S820. In some examples, the medical institutions 728 may access the genomic data and the medical history of the user 708 in the data partition 706, and may be able to provide appropriate medication based on the genome sequencing data per user and medical history. Furthermore, medication record may be added to the data partition 706 to improve the machine learning model.

In some examples, the medical institutions 728 and/or other parties may be alerted when they have been given access (e.g., text, email, phone call, etc.) responsive to a high criticality event. The medical institutions 728 and/or other parties may further be provided the location of the user 708 and the criticality of the event in the alert. In some examples, the medical institution 728 may be the institution determined to be nearest to the vehicle 722 (e.g., based on the GPS or other sensors) at the time of the event. This may allow appropriate care (e.g., police, EMTs) to be dispatched to the location of the user 708 without the user 708 being required to take further action (e.g., push an assistance button in the vehicle 722, call 911).

If the event is determined as of very low criticality, such as efficient drive guidance, such as showing faster route, shorter route, energy saving acceleration and braking, the data security manager 720 may grant a holder of KEY1, such as the vehicle 722, access to low security level of data, such as driving history data of the user 708 in the data partition 716 per prior authorization by the user 708 in step S822.

The flow chart shown in FIG. 8 is provided merely as an example and the present disclosure is not limited to the processes 802 and 810. For example, the events may be classified into two or four or more criticality levels. The events may be classified into different classes and/or criticality levels by manual definition prior to train the machine learning model, or the classes and levels generated by the machine learning model. Based on classifications, the scope of access may be determined by the data security manager 720. In some examples, the machine learning model may include different machine learning models for different applications. For example, there may be a machine learning model for determination of the events and a separate machine learning model for classification of the events.

In some examples, the machine learning model in the data security manager 720 may be further trained through the received telematic sensor data and processed data. In some examples, training a machine learning model may be performed while managing data access in the data security manager 720. In some examples, training the machine learning model may be performed in a cloud computing device (not shown) communicatively coupled to the data security manager 720. In some examples, training the machine learning model may be performed using a plurality of secure data access systems connected on the Internet. The data security manager 524 may transmit the health data with time stamps to the cloud computing device or data center that communicates with the plurality of secure data access system 800 of a plurality of users 708. The cloud computing device or the data center may store the telematic data and train the machine learning model using the telematic data. The trained machine learning model may be provided as an update to the memory device 704, and stored in appropriate data partition of the data partitions 706 and 716. This arrangement may be more convenient for when the machine learning model is dynamically trained when the data security manager 720 may have limited resources to train the machine learning model.

Figure 9:
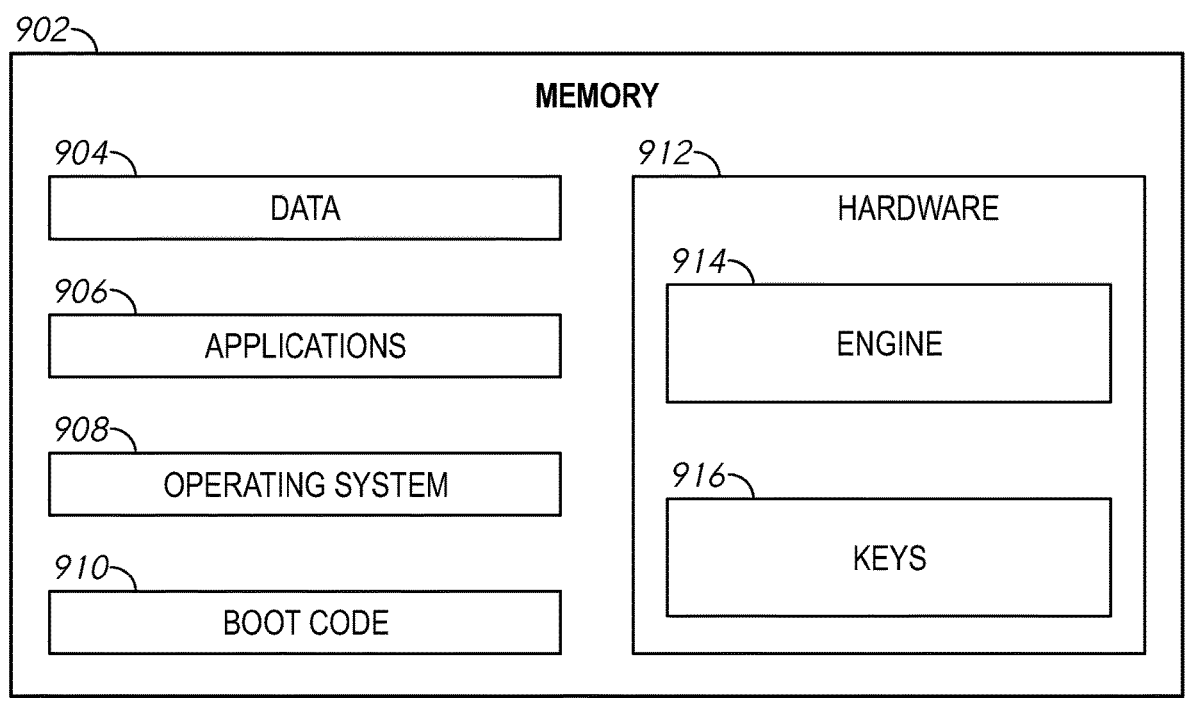
FIG. 9 is a schematic illustration of a memory in accordance with examples of the present disclosure.

FIG. 9 is a schematic illustration of a memory 902 in accordance with examples of the present disclosure. In some examples, the memory 902 may be included as the memory 126, memory 518, or memory 714. In some examples, the memory 902 may be further included as the memory 112, etc.

The memory 902 includes boot code 910, an operating system 908, applications 906, and data 904. In some examples, the boot code 910 may include executable instructions to initialize the memory 902 once a power is supplied. By executing the boot code 910, the operating system 908 may be loaded. In some examples, the operation system 908 may include executable instructions to load device drivers in the operating system 908 and applications 906 as needed. In some examples, the applications 906 may include executable instructions to perform applications that provide functionalities to users. In some examples, the data 904 may be stored in data partitions. The data partitions may include data partitions 128 and 130, data partitions 510 and 520, or data partitions 706 and 716. The data 904 may include data used by the boot code 910, the operating system 908 and the applications 906.

The memory 902 may include hardware 912 that includes engines 914 and keys 916. In some examples, the engines 914 may create keys 916 corresponding to a data owner user (e.g., the user 134, 512, 708) and provide the keys 916 to appropriate data users (e.g., the parties 136 and 138, the emergency contacts 514 and medical institutions 516, the vehicle 722, the emergency contacts 712, medical institutions 728 and/or insurance companies 710, etc.). In some examples, the engines 914 may determine whether the data user is an authentic user based on prior designation by the data owner and may grant data access if the data user is the authentic user.

In some examples, a data security manager may be implemented as a combination of the applications 906 and the engines 914. For example, the data security manager may be the data security manager 132, data security manager 524, or data security manager 720. The applications 906 may include an interface with the data owner and another computing device and/or other applications 906. The interface may receive security level designations in data write operation instructions provided by the data owner. Based on the designated security level, the data security manager may provide access depending on conditions of the events. The interface may receive type and/or level of each event from the other computing device, such as the computing device 104, computing device 506 or computing device 726. The applications 906 and the engine 914 together may determine, based on the designated security level and the type/or level of the event, the scope of the data access in the data 904 to be granted. Thus, the applications 906 and the engines 914 work together to provide secure data access to appropriate data users based on prior security level designation by the data owner for each data user and event levels.

Figure 10:
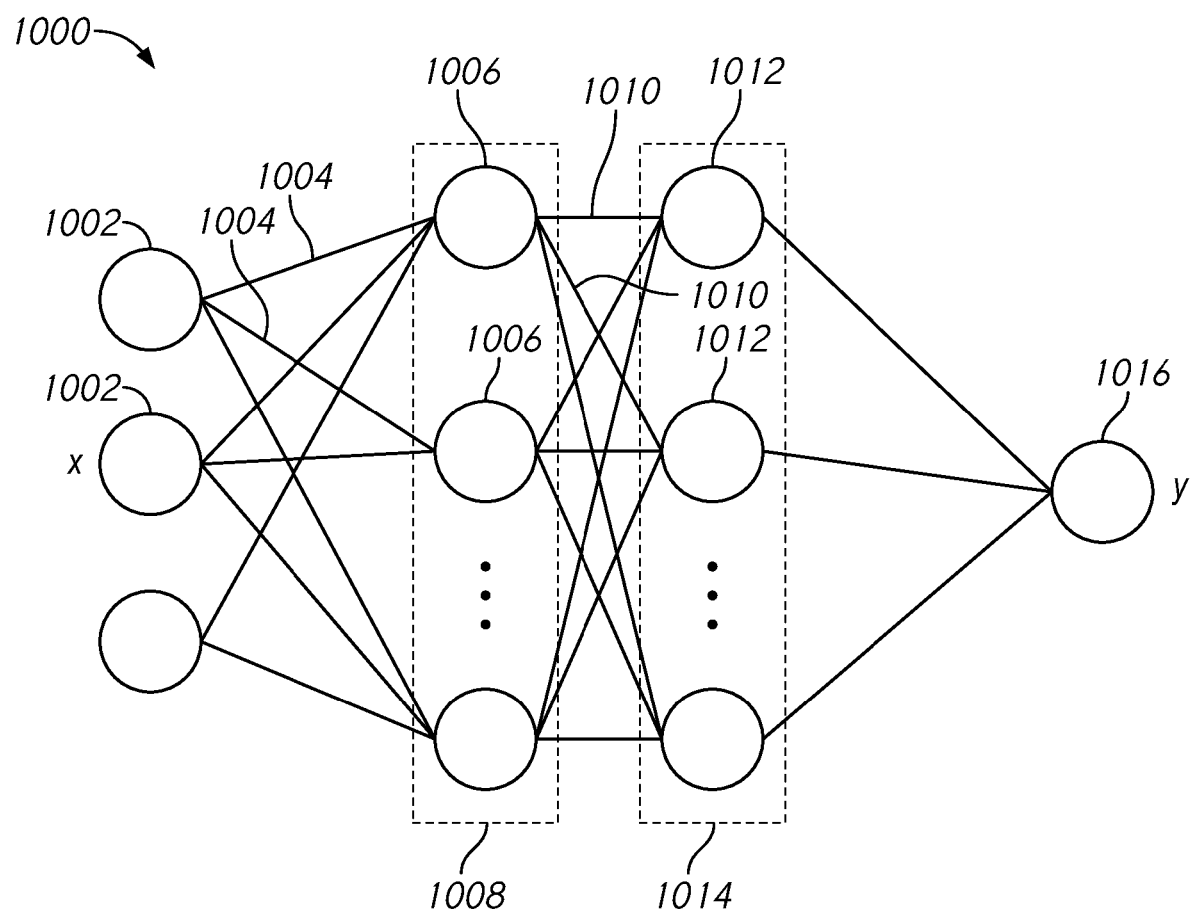
FIG. 10 is an example of a machine learning model in accordance with examples of the present disclosure.

FIG. 10 is an example of a machine learning model in accordance with examples of the present disclosure. In the example shown in FIG. 10, the machine learning model may be a machine learning model that includes a neural network 1000. In some examples, the neural network 1000 may be implemented by the computing device 104, computing device 506 or computing device 726. In other examples, the neural network may be implemented by the data security manager 132, data security manager 524 or data security manager 720. For example, computer readable instructions may be stored in a non-transitory computer-readable medium that may be executed by the computing device and/or the data security manager to implement neural network 1000. In some examples, neural network 1000 may be a convolutional network with three dimensional layers. The neural network 1000 may include input nodes 1002. In some examples, the input nodes 1002 may be organized in a layer of the neural network 1000. The input nodes 1002 may be coupled to one or more layers 1008 of hidden units 1006 by weights 1004. In some examples, the hidden units 1006 may perform operations on one or more inputs x from the input nodes 1002 based, at least in part, with the associated weights 1004. In some examples, the hidden units 1006 may be coupled to one or more layers 1014 of hidden units 1012 by weights 1010. The hidden units 1012 may perform operations on one or more outputs from the hidden units 1006 based, at least in part, on the weights 1010. The outputs of the hidden units 1012 may be provided to an output node 1016 to provide a result y.

In some examples, the input x may include one or more values for sensor data (e.g., health-related information such as body temperature, heart rate, blood pressure, blood oxygen level, etc., and/or telematic information such as velocity, acceleration, distance to nearby objects, GPS information, contact or potential contact, potential collision impact, airbag deployment record, etc.). In some examples, the input x may include one or more values for processed data (e.g., the health condition alert information and/or the drive safety alert information based on the sensor data). In some examples, the result y may include one or more events and/or different classes (e.g., medical, traffic, house security, personal security, etc.) and/or criticality levels of the one or more events. In some examples, the result may be included in a dataset associated with the scope of security level of data granted to access.

In some examples, the neural network 1000 may be trained by providing one or more training data sets. The neural network 1000 may be trained in the computing device and/or the data security manager in the memory device. In some examples, the neural network 1000 may be trained by another computing device to determine weights and/or node arrangements or other neural network configuration information, and the weights and/or other neural network configuration information provided to the computing device used to make inferences. In some examples, the training may be performed by the cloud computing device 140. In another examples, the neural network 1000 may be trained by the computing device 104 that may provide the processed data that uses a machine learning model to make inferences about the health condition alert information and/or the drive safety alert information based on the sensor data.

In some examples, the neural network 1000 may be trained using supervised learning techniques. In some examples, training data may include a set of inputs x, each associated (e.g., tagged) with a desired result y. Each input x may include one or more values from one or more sensors or values obtained by processing data from one or more sensors. For example, one input x may include a value of acceleration data from an accelerometer associated with a result y that is a likeliness of high-speed collision. Based on the training data set, the neural network 1000 may adjust one or more weights 1004, 1010, number of hidden units 1006, 1012 and/or number of layers 1008, 1014 of the neural network 1000. The trained neural network 1000 may then be used to make inferences on inputs x (that are not associated with known results) to generate results y.

In some examples, the neural network 1000 may be dynamically trained. That is, the neural network 500 may continue to adjust the one or more weights 1004, 1010, number of hidden units 1006, 1012 and/or number of layers 1008, 1014 based on new data. For example, a user intervention (e.g., a medical professional entering medical conditions, a policeperson or a car repair person enters vehicle conditions) may cause the neural network 1000 to adjust.

The machine learning model shown in FIG. 10 is provided merely as an example and the present disclosure is not limited to the neural network 1000. For example, the machine learning model may include multiple neural network 1000 and/or other machine learning models, using supervised techniques (e.g., support vector machine, decision tree, regression, etc.). Furthermore, in some examples, the machine learning model may be trained using semi-supervised and/or unsupervised techniques (e.g., clustering, principal component analysis, etc.). In these examples, data sets may not include a desired result associated with every input.

As disclosed herein, in a variety of applications (e.g., in-house, medical, traffic, house security, personal security), a computing device and/or a data security manager in a memory device implementing a machine learning model may analyze criticality of an event associated with a user or the user's belongings (e.g., vehicle) and provide relevant parties appropriate security level of data based on classification of the event, such as a classes (e.g., medical, traffic, house security, personal security, etc.) and/or a criticality level of the event. Accordingly, the devices, systems, methods, and apparatuses of the present disclosure may grant relevant parties to access different security levels of data on the memory device based, at least in part, on the classification of the event when the user is unavailable.

Of course, it is to be appreciated that any one of the examples, embodiments or processes described herein may be combined with one or more other examples, embodiments and/or processes or be separated and/or performed amongst separate devices or device portions in accordance with the present systems, devices and methods. For example, the processes shown in FIGS. 6 and 8 may be implemented, at least in part by the system shown in FIG. 1.

Finally, the above-discussion is intended to be merely illustrative and should not be construed as limiting the appended claims to any particular embodiment or group of embodiments. Thus, while various embodiments of the disclosure have been described in particular detail, it should also be appreciated that numerous modifications and alternative embodiments may be devised by those having ordinary skill in the art without departing from the broader and intended spirit and scope of the present disclosure as set forth in the claims that follow. Accordingly, the specification and drawings are to be regarded in an illustrative manner and are not intended to limit the scope of the appended claims.

What is claimed is:

1. A system comprising:
    a memory device comprising a first partition and a second partition, wherein the first partition is configured to store first data of a first user at a first security level and the second partition is configured to store second data of the first user at a second security level different from the first security level;
    a computing device comprising at least one processor configured to implement a machine learning algorithm; and
    a sensor configured to provide information to the computing device,
    wherein the machine learning algorithm is configured to analyze the information from the sensor to determine an occurrence of an event, and
    based on a determination of the occurrence of the event, the computing device is configured to provide access to at least one of the first data or the second data to a second user.

2. The system of claim 1 wherein the second security level is higher than the first security level.

3. The system of claim 2, wherein the second partition is configured to store the second data with encryption.

4. The system of claim 3, wherein the first partition is configured to store the first data without encryption.

5. The system of claim 3, wherein the second partition is configured to store the second data that is encrypted with a first key, and
    wherein the memory device is configured to provide access to the second data to the second user with a second key that is different from the first key.

6. The system of claim 5, wherein the first partition is configured to store the first data that is encrypted with a third key, and
    wherein the memory device is configured to provide access to the first data to the second user with the third key.

7. The system of claim 6, wherein the memory device is further configured to provide access to the first data to a third user with the third key.

8. The system of claim 1, further comprising a mobile device coupled to the sensor,
    wherein the sensor is configured to provide sensor data as the information,
    wherein the mobile device is further configured to process the sensor data and further configured to provide processed data based on the sensor data, and
    wherein the machine learning algorithm is configured to analyze the sensor data and the processed data.

9. The system of claim 8, wherein the mobile device comprises the sensor.

10. The system of claim 1, further comprising a telematic system in a vehicle,
    wherein the sensor is a telematic sensor installed in the vehicle coupled to the telematic system,
    wherein the telematic sensor is configured to provide telematic sensor data as the information,
    wherein the telematic system is configured to process the telematic sensor data and further configured to provide telematic data based on the telematic sensor data to the computer device, and
    wherein the machine learning algorithm is configured to analyze the telematic sensor data and the telematic data.

11. The system of claim 1, wherein the machine learning algorithm is further configured to determine criticality of the event, and
    based on a determination of the criticality of the event, the memory device is configured to provide access to the at least one of the first data or the second data to the second user.

12. The system of claim 11, wherein the machine learning algorithm is further configured to determine criticality level of the event, and
    based on a determination of the criticality level of the event, the memory device is configured to provide access to the at least one of the first data or the second data to the second user.

13. The system of claim 11, wherein the machine learning algorithm is further configured to determine criticality class of the event, and
    based on a determination of the criticality class of the event, the memory device is configured to provide access to the at least one of the first data or the second data to the second user.

14. A method comprising:
    storing first data of a first user at a first security level in a first partition of a memory device;
    storing second data of the first user at a second security level in a second partition of the memory device; and
    providing access to at least one of the first data or the second data to a second user responsive to an occurrence of an event.

15. The method of claim 14, further comprising:
    receiving, at a computing device, information based on sensor data from a sensor; and
    analyzing, with a machine learning algorithm implemented by the computing device, the information to determine the occurrence of the event.

16. The method of claim 14, wherein the second security level is higher than the first security level.

17. The method of claim 16, wherein storing the second data comprises storing the second data with encryption.

18. The method of claim 17, wherein storing the first data comprises storing the first data without encryption.

19. The method of claim 17, further comprising:
    encrypting the second data with a first key prior to storing the second data; and
    providing access to the second data to the second user with a second key that is different from the first key.

20. The method of claim 19, further comprising:
encrypting the first data with a third key prior to storing the first data; and
providing access to the first data to the second user with the third key.

21. The method of claim 20, further comprising providing access to the first data to a third user with the third key.

22. A memory device comprising:
a processor; and
at least one non-transitory computer readable medium configured to store:
data comprising:
a first partition configured to store first data of a first user at a first security level; and
a second partition configured to store second data of the first user at a second security level different from the first security level; and
executable instructions comprising a data security manager that when executed by the processor cause the processor to provide access to at least one of the first data or the second data to a second user responsive to an occurrence of an event.

23. The memory device of claim 22, wherein the non-transitory computer readable medium is further configured to store instructions that comprise a machine learning algorithm that when executed by the processor cause the processor to
analyze information received from a sensor to determine the occurrence of the event.

24. The memory device of claim 22, wherein the second security level is higher than the first security level.

25. The memory device of claim 24, wherein when executed by the processor, the data security manager further cause the processor to store the second data with encryption in the second partition.

26. The memory device of claim 25, wherein when executed by the processor, the data security manager further cause the processor to store the first data without encryption in the first partition.

27. The memory device of claim 25, wherein when executed by the processor, the data security manager further cause the processor to:
encrypt the second data with a first key;
store the encrypted second data in the second partition; and
provide access to the second data to the second user with a second key that is different from the first key.

28. The memory device of claim 25, wherein when executed by the processor, the data security manager further cause the processor to:
encrypt the first data with a third key;
store the encrypted first data in the first partition; and
provide access to the first data to the second user with the third key.

29. The memory device of claim 28, wherein when executed by the processor, the data security manager further cause the processor to provide access to the first data to a third user with the third key, the third user different from the second user.

* * * * *